United States Patent
Badillo

(10) Patent No.: US 10,351,070 B2
(45) Date of Patent: Jul. 16, 2019

(54) METHOD OF INTERCONNECTING A VEHICLE RACK

(71) Applicant: Intelligent Designs 2000 Corp., Aurora, CO (US)

(72) Inventor: Paul Badillo, Littleton, CO (US)

(73) Assignee: INTELLIGENT DESIGNS 2000 CORP., Aurora, CO (US)

( * ) Notice: Subject to any disclaimer, the term of this patent is extended or adjusted under 35 U.S.C. 154(b) by 22 days.

(21) Appl. No.: 15/344,244

(22) Filed: Nov. 4, 2016

(65) Prior Publication Data

US 2017/0203697 A1 Jul. 20, 2017

Related U.S. Application Data

(60) Provisional application No. 62/280,064, filed on Jan. 18, 2016.

(51) Int. Cl.
*B60R 9/045* (2006.01)
*B60R 3/00* (2006.01)

(52) U.S. Cl.
CPC .............. *B60R 9/045* (2013.01); *B60R 3/005* (2013.01)

(58) Field of Classification Search
CPC ....... B60R 9/045; B60R 9/048; B60R 9/0485; B60R 3/005; B60R 3/007; B60R 3/02
See application file for complete search history.

(56) References Cited

U.S. PATENT DOCUMENTS

| | | |
|---|---|---|
| D30,369 S | 3/1899 | Mandt |
| D33,754 S | 12/1900 | Hien |
| 704,436 A | 7/1902 | Cluff |
| 744,113 A | 11/1903 | Rye |
| 1,564,776 A | 12/1925 | Green |
| 1,606,954 A | 11/1926 | Moen et al. |
| 2,387,779 A | 10/1945 | Strauss |
| 2,492,841 A | 12/1949 | Burkey |
| 2,521,815 A | 9/1950 | Will |
| 2,663,472 A | 12/1953 | Belgau |
| 2,784,888 A | 3/1957 | Lecanu-Deschamps |
| 2,800,264 A | 7/1957 | McFadyen |
| 2,967,635 A | 1/1961 | Barnett |
| 3,158,301 A | 11/1964 | Hedgepeth |
| 3,215,323 A | 11/1965 | Bonitt |

(Continued)

OTHER PUBLICATIONS

Advertisement: Yakima Spare Tire Carrier, Cargo Basket for Roof Racks, available at http://www.rackoutfitters.com/catalog/yakima_spare_tire_carrier_1836640.htm., dated Jul. 7, 2003, 1 page.

(Continued)

*Primary Examiner* — Derek J Battisti

(74) *Attorney, Agent, or Firm* — Sheridan Ross PC

(57) ABSTRACT

A convertible roof rack is provided that is generally comprised of a front support and a roof rack that is spaced from the roof of a vehicle. The roof rack is also rotatably interconnected to a support structure associated with the rear of the vehicle such that it is capable of moving from a first position of use adjacent to the roof to a second position of use away from the roof where the front support remains interconnected to the vehicle adjacent to the windshield. As such, electrical connections associated with the front support remain intact when the roof rack is rotated away from the roof.

13 Claims, 27 Drawing Sheets

(56) References Cited

U.S. PATENT DOCUMENTS

| | | | |
|---|---|---|---|
| 3,260,929 A | | 7/1966 | Hedgepeth |
| 3,330,454 A | | 7/1967 | Bott |
| 3,531,006 A | | 9/1970 | Farchmin |
| D223,753 S | | 6/1972 | Seals |
| 3,762,587 A | | 10/1973 | Longee, Sr. |
| 3,765,713 A | | 10/1973 | Suitt |
| 3,902,642 A | | 9/1975 | McNeece |
| 3,905,499 A | * | 9/1975 | Speidel ............... B60P 3/1016 414/462 |
| D243,447 S | | 2/1977 | Smith, III et al. |
| 4,240,571 A | * | 12/1980 | Ernst .................. B60R 9/042 224/310 |
| 4,249,683 A | | 2/1981 | Park |
| 4,336,897 A | | 6/1982 | Luck |
| 4,350,471 A | | 9/1982 | Lehmann |
| 4,817,834 A | | 4/1989 | Weiler |
| 4,948,024 A | | 8/1990 | Warner et al. |
| 4,995,538 A | | 2/1991 | Marengo |
| D324,664 S | | 3/1992 | Burnette |
| 5,171,083 A | | 12/1992 | Rich |
| 5,320,061 A | | 6/1994 | Laughlin et al. |
| 5,381,939 A | | 1/1995 | Tippets |
| D359,134 S | | 6/1995 | Toews |
| 5,560,525 A | | 10/1996 | Grohmann et al. |
| D406,557 S | | 3/1999 | Bentley |
| D413,562 S | | 9/1999 | Van Dusen et al. |
| 6,003,633 A | | 12/1999 | Rolson |
| 6,015,074 A | | 1/2000 | Snavely et al. |
| D422,553 S | | 4/2000 | VonDuyke |
| 6,116,378 A | | 9/2000 | Barrow |
| 6,126,051 A | | 10/2000 | Potter |
| D434,364 S | | 11/2000 | Bauer et al. |
| 6,152,339 A | * | 11/2000 | Kreisler ................. B60R 9/00 224/309 |
| D434,718 S | | 12/2000 | Kreisler |
| D435,510 S | | 12/2000 | Quidort |
| 6,179,180 B1 | | 1/2001 | Walker et al. |
| D442,289 S | | 5/2001 | Ziaylek, et al. |
| 6,308,874 B1 | | 10/2001 | Kim et al. |
| 6,425,508 B1 | | 7/2002 | Cole et al. |
| 6,428,263 B1 | | 8/2002 | Schellens |
| D463,358 S | | 9/2002 | Thomas |
| D470,451 S | | 2/2003 | Bushart et al. |
| 6,561,397 B1 | | 5/2003 | Bauer et al. |
| 6,581,813 B2 | | 6/2003 | Bove et al. |
| D477,562 S | | 7/2003 | McCoy et al. |
| 6,604,606 B1 | | 8/2003 | McDougal et al. |
| D479,884 S | | 9/2003 | Berryman |
| D481,003 S | | 10/2003 | Bauer et al. |
| 6,715,652 B2 | | 4/2004 | Kmita et al. |
| D490,163 S | | 5/2004 | Thurston |
| 6,739,349 B2 | | 5/2004 | Kastenschmid et al. |
| 6,755,332 B2 | * | 6/2004 | Crane ................... B60R 9/00 224/321 |
| 6,772,928 B2 | | 8/2004 | Ford et al. |
| D508,015 S | | 8/2005 | Badillo |
| D512,783 S | | 12/2005 | Badillo |
| D520,938 S | | 5/2006 | Badillo |
| 7,055,454 B1 | | 6/2006 | Whiting et al. |
| D537,404 S | | 2/2007 | Bauer et al. |
| 7,226,226 B2 | | 6/2007 | Troman |
| 7,226,266 B2 | | 6/2007 | Henderson et al. |
| 7,249,927 B2 | | 7/2007 | Wooten et al. |
| D549,838 S | | 8/2007 | Badillo |
| D558,123 S | * | 12/2007 | Murillo ............... D12/412 |
| D564,419 S | | 3/2008 | Clontz |
| D578,952 S | * | 10/2008 | Badillo ............... D12/406 |
| D603,321 S | | 11/2009 | Kramer |
| D621,328 S | | 8/2010 | Sistare et al. |
| D624,005 S | | 9/2010 | Winner et al. |
| D638,333 S | | 5/2011 | Freeman |
| D650,316 S | | 12/2011 | Pirolo et al. |
| 8,496,146 B2 | | 7/2013 | Badillo |
| D765,577 S | | 9/2016 | Kmita et al. |
| D772,783 S | | 11/2016 | Schleef |
| D815,012 S | | 4/2018 | Badillo |
| D825,924 S | | 8/2018 | Tuang |
| 2005/0082326 A1 | * | 4/2005 | Badillo ............... B60R 9/00 224/326 |
| 2005/0092796 A1 | * | 5/2005 | Essig ................ B60R 9/00 224/321 |
| 2005/0095102 A1 | * | 5/2005 | Watson ............... B60R 9/042 414/462 |
| 2011/0101056 A1 | * | 5/2011 | Barkey ............... B60R 9/052 224/321 |
| 2013/0299538 A1 | | 11/2013 | Badillo |

OTHER PUBLICATIONS

Advertisement: Thule 840-Playpen Basket, Cargo Basket for Roof Racks, available at http://www.rackoutfitters.com/catalog/thule_840_-_playpen_basket_1885452.htm, dated Jul. 7, 2003, 1 page.

Advertisement: SURCO, Products, Inc., "Basket rack-it just flat out carries what you need to take," available at http://www.everythingsuv.com/surco_safari_roof_racks-esuv.asp, dated Jul. 7, 2003, 10 pages.

U.S. Appl. No. 29/535,865, filed Aug. 11, 2015, Badillo.

U.S. Appl. No. 29/535,957, filed Aug. 12, 2015, Badillo.

Advertisement: KargoMaster, Kargo Master Safari Racks, available at http://www.kargomaster.com/jeep23.asp?rack=sport_jeep, Jul. 7, 2007, 1 page.

Advertisement: KargoMaster, The Bushman Steel Rack, available at http://www.kargomaster.com/bushman.asp?type=Jeep, dated Jul. 7, 2003, 1 page.

Advertisement: KargoMaster, Seregenti Telescoping Steel Rack, available at http://www.kargomaster.com/seregenti.asp?type=Jeep, dated Jul. 7, 2003, 1 page.

Advertisement: Bauer Vehicle Gear Roof Racks, Roof Storage, Bike Storage & Pet Barriers from Eve, available at http://www.everythingsuv.com/bvg_products-esuv.asp, Jul. 7, 2003, 2 pages.

Advertisement: Manik Original Off-Road Equipment, Hummer Rough Terrain Package New Product Release "Tilt-Forward 1-Piece Front Bar," 2002, 1 page.

Advertisement: Manik Original Off-Road Equipment, Hummer Rough Terrain Package New Product Release "Combination Tube Step Rocker Bar," 2002, 1 page.

Advertisement: Congo Cage Jeep Rack, available at http://www.kargomaster.com/item.asp?id=62, printed Apr. 17, 2009, 13 pages.

Product Literature entitled, "921-Dave's Rack 921-12X," Olympic 4X4, date unknown, 10 pages.

Advertisement: 921-Daves Rack, Olympic 4X4 Products for over 60 years, available at http://olympic4X4products.com/utility-racks/921-daves-rack, printed Jan. 14, 2011, 3 pages.

U.S. Appl. No. 15/586,769, filed May 4, 2017, Badillo.

U.S. Appl. No. 29/612,924, filed Aug. 4, 2017, Badillo.

U.S. Appl. No. 29/612,927, filed Aug. 4, 2017, Badillo.

U.S. Appl. No. 29/612,929, filed Aug. 4, 2017, Badillo.

U.S. Appl. No. 29/612,930, filed Aug. 4, 2017, Badillo.

U.S. Appl. No. 29/640,814, filed Mar. 16, 2018, Badillo.

"Installation Guide: BR-JPTJ2D-1-0 BajaRack JEEP TJ 2 Doors," BajaRack Adventure Equipment, 4 page, first sold 2013.

"BR-JPJK-Series Installation Instructions," BajaRack Adventure Equipment, 5 pages, first sold 2013.

"Installation Guide: BR-JP-JK4D-1-0 BajaRack JEEP JK 4 Doors," BajaRack Adventure Equipment, 6 pages, first sold 2013.

Official Action for U.S. Appl. No. 12/861,034 dated Oct. 4, 2012, 16 pages.

Notice of Allowance for U.S. Appl. No. 12/861,034 dated Mar. 29, 2013, 7 pages.

Official Action for U.S. Appl. No. 13/942,489 dated May 3, 2016, 11 pages.

Final Action for U.S. Appl. No. 13/942,489 dated Sep. 29, 2016, 15 pages.

Notice of Allowance for U.S. Appl. No. 13/942,489 dated Feb. 7, 2017, 5 pages.

Official Action for U.S. Appl. No. 29/535,865 dated Aug. 23, 2016, 5 pages.

Final Action for U.S. Appl. No. 29/535,865 dated Feb. 2, 2017, 8 pages.

(56) References Cited

OTHER PUBLICATIONS

Official Action for U.S. Appl. No. 29/535,865, dated Nov. 3, 2017 10 pages.
Official Action for U.S. Appl. No. 29/535,865, dated Jun. 28, 2018, 9 pages.
Notice of Allowance for U.S. Appl. No. 29/535,957 dated Mar. 27, 2017, 6 pages.
Official Action for U.S. Appl. No. 15/586,769 dated Jul. 17, 2017 14 pages.
Official Action for U.S. Appl. No. 15/586,769, dated Dec. 5, 2017 9 pages.
Official Action for U.S. Appl. No. 15/586,769, dated Jun. 26, 2018, 8 pages.
Notice of Allowance for U.S. Appl. No. 29/612,929 dated Sep. 27, 2018, 7 pages.
Notice of Allowance for U.S. Appl. No. 29/612,927 dated Sep. 27, 2018, 7 pages.
Notice of Allowance for U.S. Appl. No. 29/612,924 dated Sep. 27, 2018, 7 pages.
Notice of Allowance for U.S. Appl. No. 29/612,930, dated Sep. 27, 2018, 7 pages.

\* cited by examiner

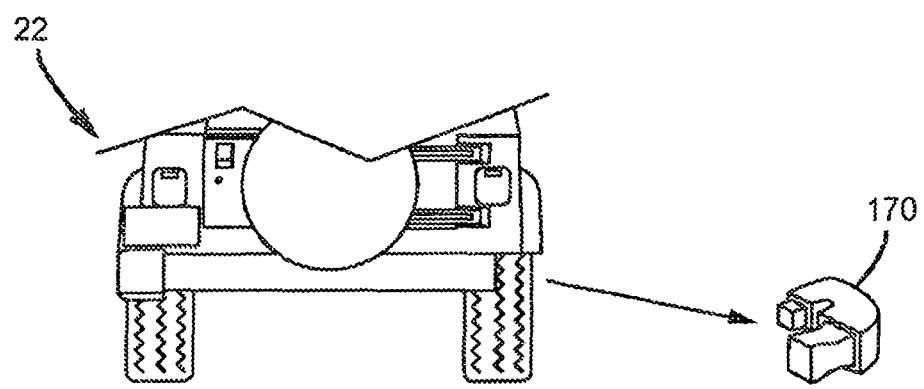
FIG. 24
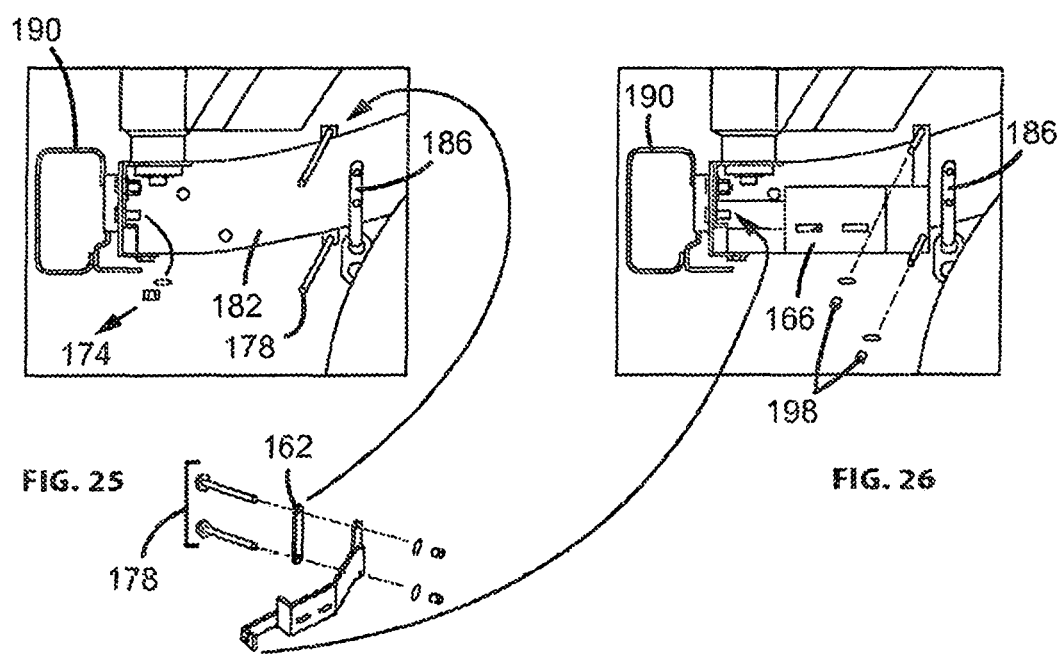
FIG. 25
FIG. 26

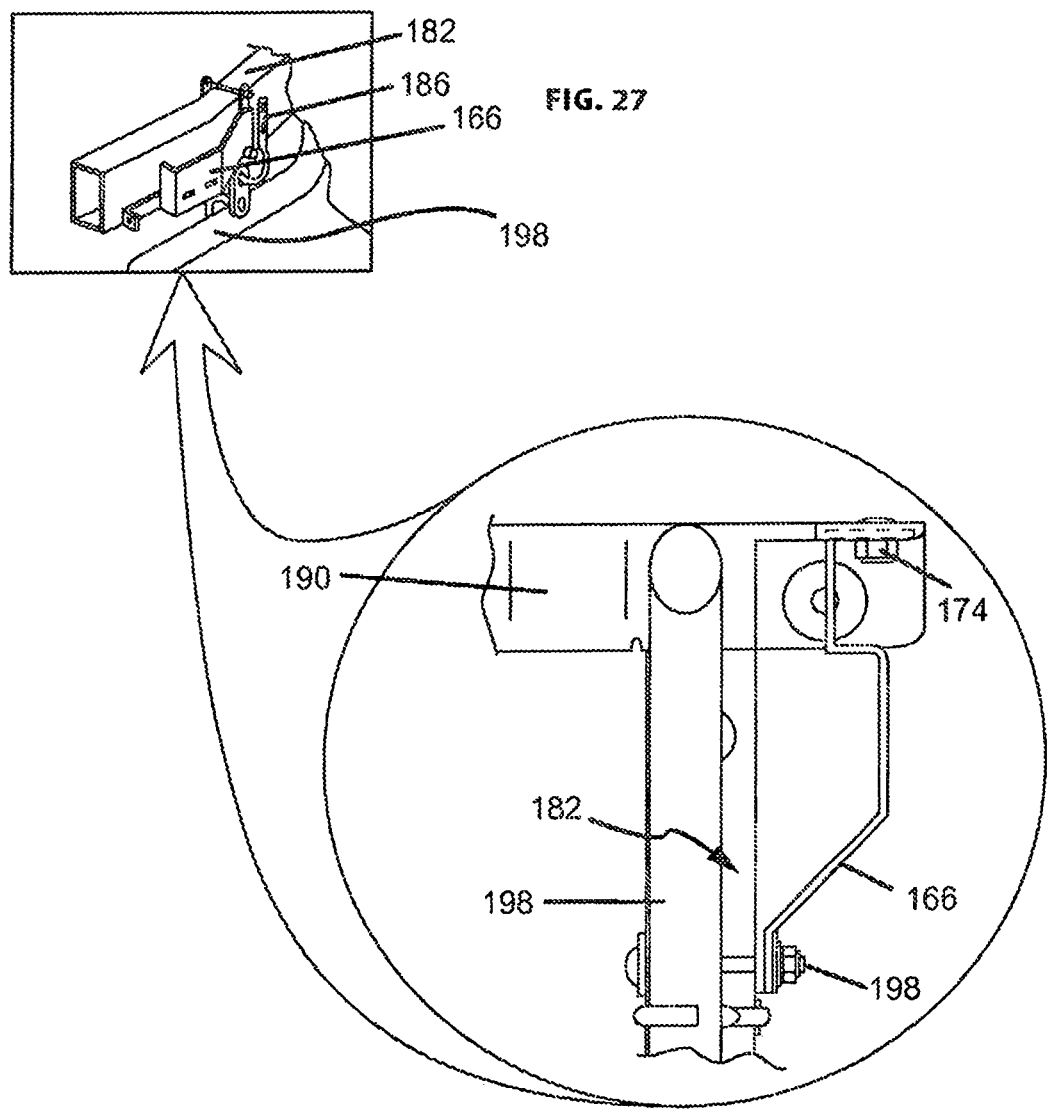

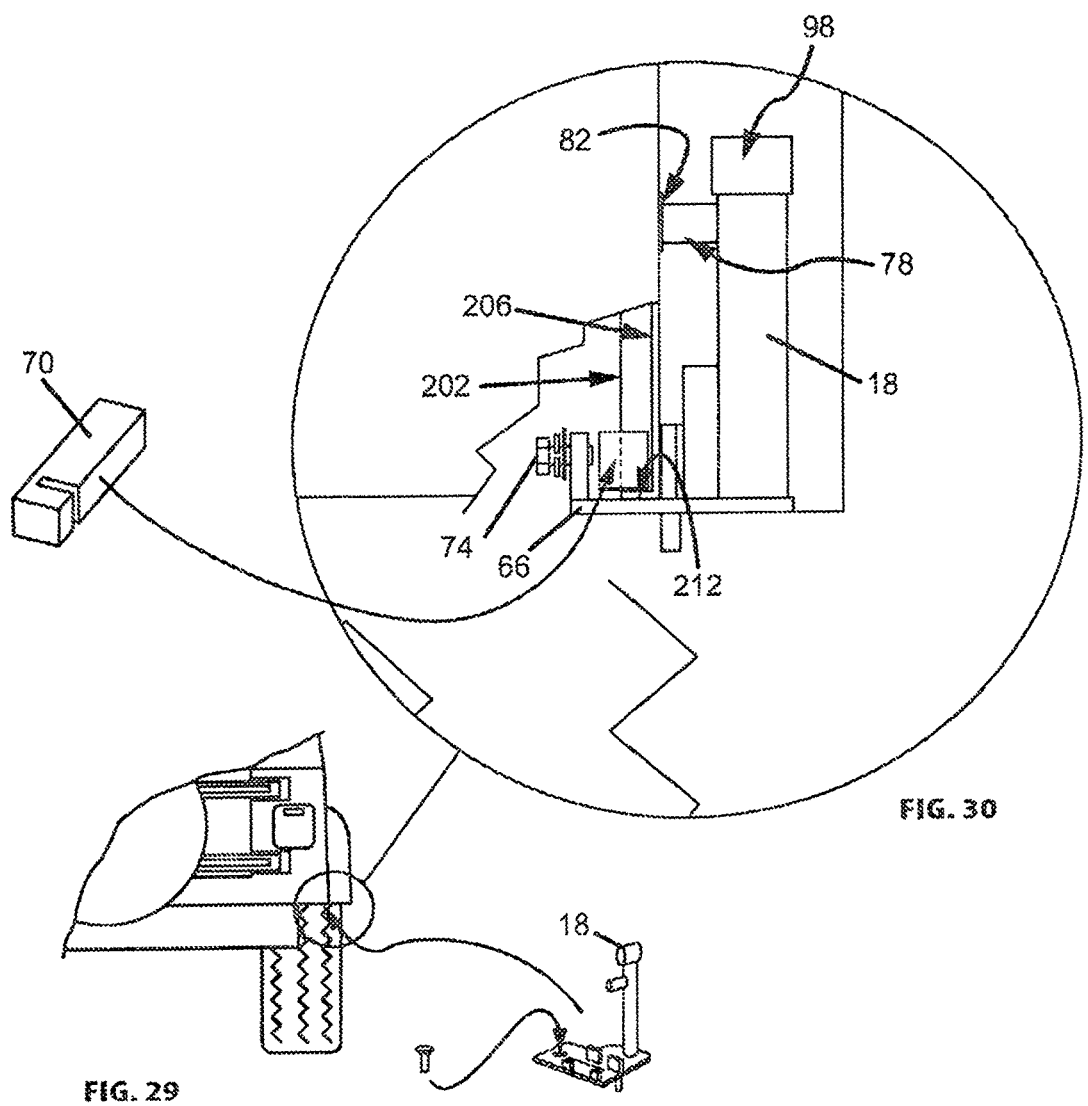

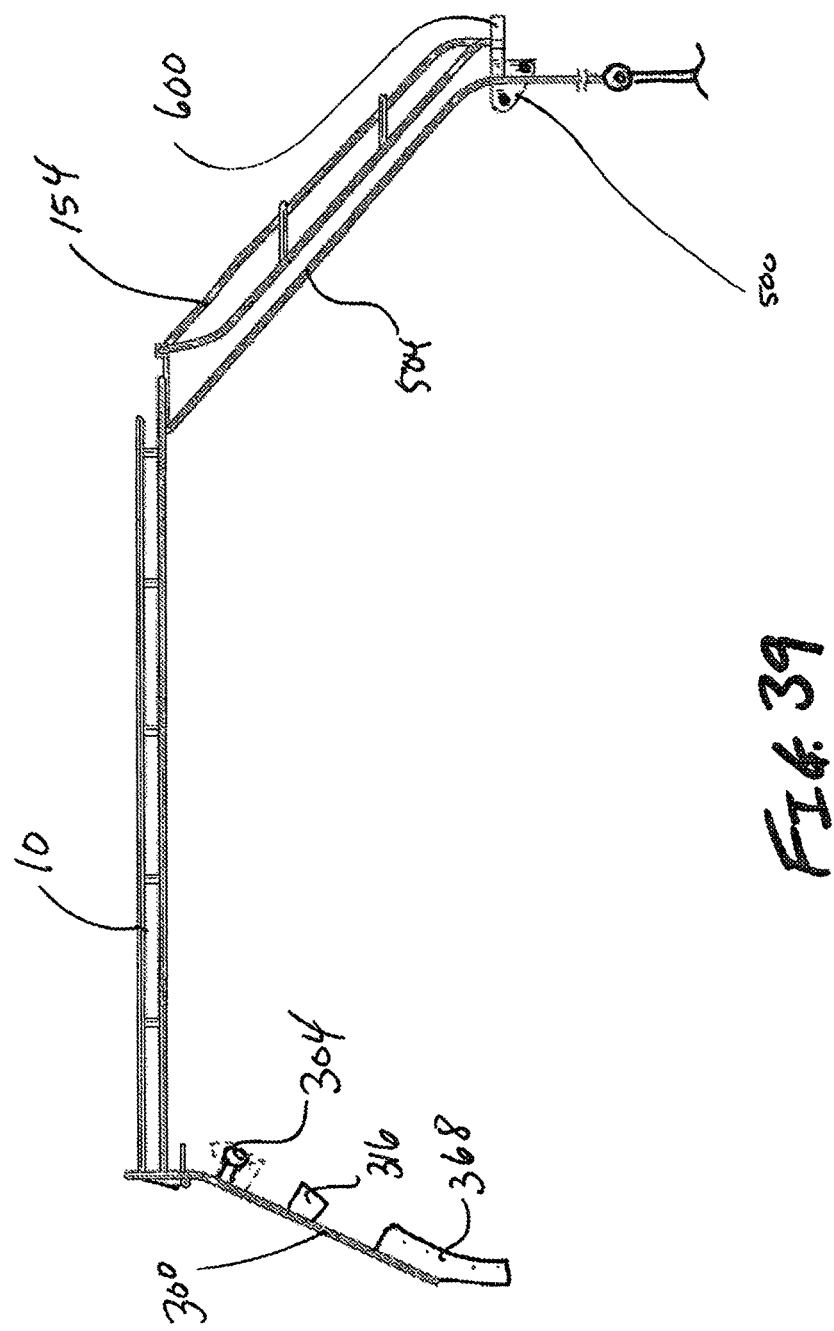

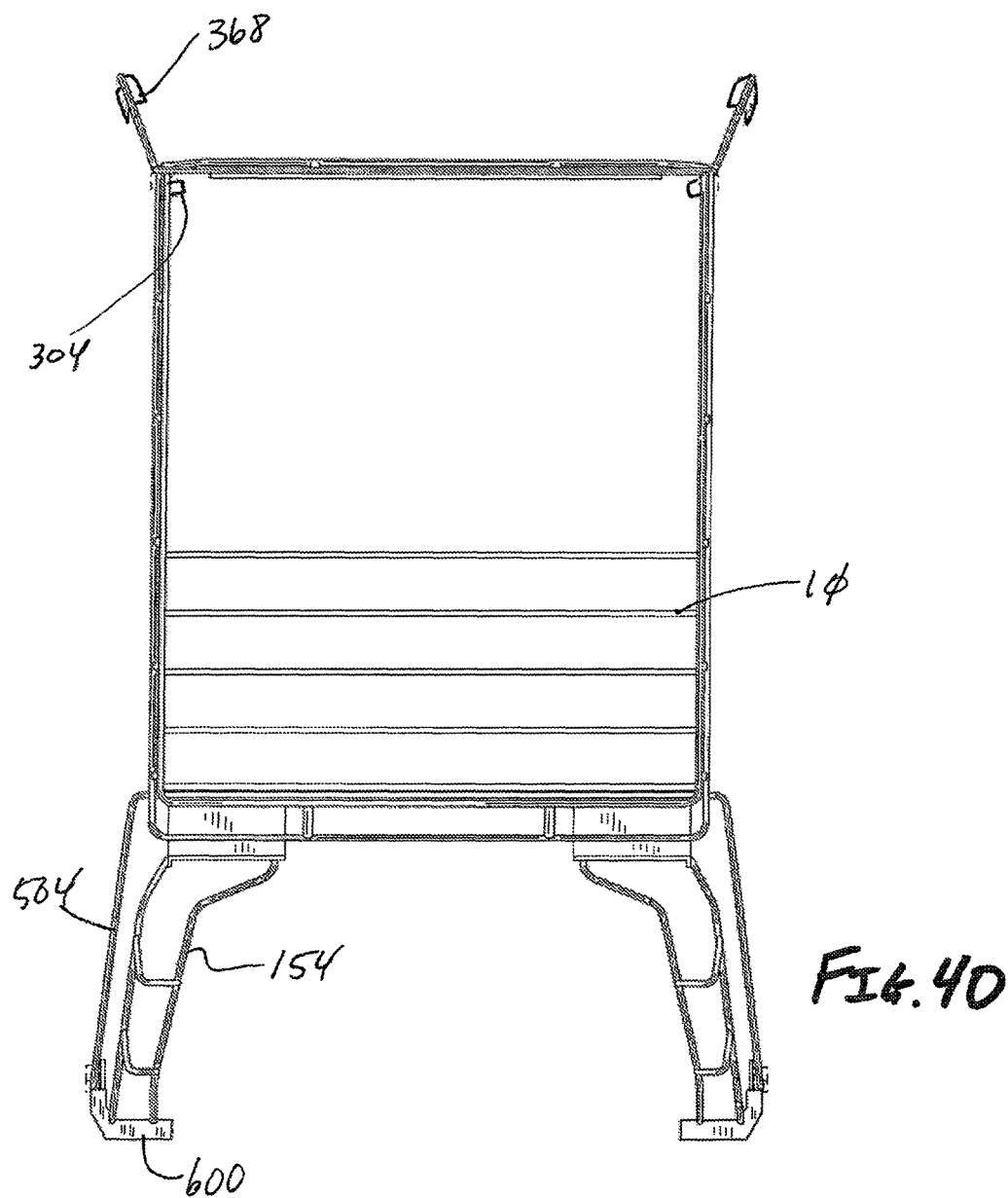

METHOD OF INTERCONNECTING A VEHICLE RACK

CROSS REFERENCE TO RELATED APPLICATIONS

This application claims the benefit of U.S. Provisional Patent Application No. 62/280,064, filed Jan. 18, 2016, the entire disclosure of which is incorporated by reference herein.

This application is related to U.S. patent application Ser. No. 29/534,977, filed Aug. 3, 2015, the entire disclosure of which is incorporated by reference herein.

This patent application also related to U.S. patent application Ser. No. 13/942,489, filed Jul. 15, 2013, which is a continuation of U.S. patent application Ser. No. 12/861,034, filed Aug. 23, 2010, now U.S. Pat. No. 8,496,146, which claims the benefit of U.S. Provisional Patent Application Ser. No. 61/237,177, filed Aug. 26, 2009, each of which is incorporated by reference in its entirety herein.

This application is also related to abandoned U.S. Patent Application Publication No. 2005/0082326, filed Sep. 24, 2004, U.S. Pat. No. D578,952, filed Feb. 20, 2008, U.S. Pat. No. D512,783, filed Jun. 4, 2003, and U.S. Pat. No. D508,015, filed Mar. 17, 2003, the entire disclosures of which are incorporated by reference herein.

FIELD OF THE INVENTION

Embodiments of the present invention are generally related to storage racks for interconnection to a motor vehicle. More specifically, one embodiment of the present invention is a vehicle storage rack with a fixed portion and a selectively movable portion capable of moving from a first position of use to a second position of use.

BACKGROUND OF THE INVENTION

Storage racks are often installed on vehicles to permit carrying additional items that will not fit within the vehicle or are not desirable to carry in the vehicle. Storage racks also often accommodate a variety of lights, such as fog lights. It is sometimes necessary to remove the storage rack to make modifications to the vehicle. For example, the storage rack of some vehicles must be removed to gain access to various roof elements for removal or replacement. Stated differently changing the exterior vehicle configuration often requires roof rack removal. This is often a cumbersome and difficult task wherein any lights interconnected to the rack and associated wiring must be removed. To complicate this task, and regardless if lights are employed, roof racks are often heavy, and may be difficult or dangerous to remove and replace.

Another drawback of the roof racks of the prior art is that they are often hard-mounted to the vehicle, which requires the drilling additional holes into the vehicle. If drilled by the vehicle owner, these holes are often created incorrectly, thereby requiring re-drilling, and possibly, decreasing the resale value of the vehicle. Thus it would be desirable to provide a storage rack that is easily interconnected to a vehicle without requiring permanent modifications to the vehicle.

Thus it is a long felt need to provide a roof storage rack that is easily installed on a vehicle and that is easy to remove, completely or partially, from the vehicle so that the vehicle may be modified. It is also desirable to provide a storage rack that allows for lights and other electrical components associated with the vehicle storage rack to remain interconnected to the power source of the vehicle. The following disclosure describes an improved vehicle storage rack that allows front mounted lights to be maintained with the rack when another portion of the rack is moved to provide access to various areas of the vehicle. The rack of one embodiment of the invention includes features that enhance stability.

SUMMARY OF THE INVENTION

It is one aspect of embodiments of the present invention to provide a roof storage rack ("roof rack") for installation on a vehicle. The roof rack of one embodiment of the present invention includes a front support that can accommodate at least one light. The front support is interconnected to the vehicle adjacent to the windshield and selectively interconnected to the roof rack. The roof rack of this embodiment of the present invention is also interconnected to a rear support rotatably interconnected to members associated with a rear portion of the vehicle. One advantage of embodiments of the present invention is that the roof rack is installed by using existing holes or standard vehicle hardware so no vehicle modifications need to be made to install the roof rack.

It is another aspect of some embodiments of the present invention to provide a roof rack that includes a front support that remains interconnected to the vehicle when the roof rack is removed. More specifically, one embodiment of the present invention employs a front support that is firmly associated with a vehicle windshield frame. As one of ordinary skill in the art will appreciate, often lights are associated with the front support, such as fog lights. Such lights include a plurality of wires interconnected to the vehicle power source. These wires are often fed through the tubular structure of the front support and interconnected to the vehicle battery. In one embodiment of the present invention, the front support remains fixed to the vehicle roof and/or windshield frame such that removal of the roof rack from the roof does not require lights disconnection.

It is another aspect of some embodiments of the present invention to provide a roof rack that is relatively easy to install. More specifically, one advantage of embodiments of the present invention is that no additional holes need to be drilled into the vehicle for installation. That is, embodiments of the present invention utilize existing holes and/or fasteners of the vehicle frame and/or body. Further, one embodiment of the present invention uses both the vehicle frame and body to provide a stable roof rack that helps prevent roof rack sway. A plurality of wear plates, bumpers, and clamps may be glued or otherwise interconnected to the vehicle to prevent vehicle marring or wear from portions of the roof rack that are positioned adjacent to the vehicle body. As such, the roof rack may be installed and removed without damaging the vehicle, which improves the resale value.

It is another aspect of some embodiments of the present invention to provide a roof rack that may be installed and operated by a single individual. More specifically, the roof rack may be disassembled into easy to handle pieces that facilitate integration onto the vehicle. In operation, the roof rack is designed to rotate away from the roof and the front support and then be supported by a lanyard, rope, tether, or bungee that interconnects the roof rack to the front support. Roof racks of embodiments of the present invention are thus able to achieve the contemplated rotation under the force and guidance of one individual, which will be described in further detail below.

It is yet another aspect of the present invention to provide a roof rack that is adapted to receive other items, such as a ladder, a sun roof insert, and other equipment, as described in some of the above-identified references.

It is another aspect of the present invention to provide a convertible roof rack adapted for use with a vehicle comprising: a front support adapted to interconnect to a vehicle adjacent a windshield thereof; a first support tower and a second support tower, each interconnected to the frame of the vehicle adjacent to the rear thereof; a support bar having a first leg operably interconnected to the first support tower and a second leg operably interconnected to the second support tower; a roof rack interconnected on one end to the support bar between the first leg and the second leg, the roof rack being selectively interconnected on another end to the front support; and wherein the roof rack is capable of movement from a first position of use adjacent to the roof of the vehicle to a second position of use away from the roof of the vehicle while the front support remains interconnected to the vehicle.

It is still yet another aspect of the present invention to provide a convertible roof rack adapted for use with a vehicle comprising: a front support adapted to interconnect to a vehicle adjacent to a windshield thereof; a means for supporting interconnected to the vehicle; a roof rack rotatably interconnected on one end to the means for supporting, the roof rack being selectively interconnected on another end to the front support; wherein the roof rack is capable of movement from a first position of use adjacent to the roof of the vehicle to a second position of use away from the roof of the vehicle while the means for supporting remains associated with the vehicle; and wherein the front support remains fixed to the vehicle regardless of the position of the roof rack.

It is yet another aspect of the present invention to provide a method of using a convertible roof rack adapted for use with a vehicle comprising; interconnecting a front support to a vehicle adjacent to a windshield thereof using existing vehicle hardware; interconnecting a first support member and a second support member to the frame of the vehicle; interconnecting the support bar to the first support member and the second support member; interconnecting the roof rack to a support bar; moving the roof rack to a first position of use by rotating the support bar towards a roof of the vehicle; interconnecting the roof rack to the front support; and moving the roof rack to a second position of use by rotating the support bar away from the roof of the vehicle while maintaining the position of the front support.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 24 is a rear elevation view of a vehicle for receiving one embodiment of the present invention shown with a rear bumper end cap removed;

FIG. 25 is a detailed view of FIG. 24 showing the interconnection of the clamp plate to the vehicle's frame;

FIG. 26 is a detailed view of FIG. 24 showing the interconnection of a frame extension plate;

FIG. 27 is a partial perspective view of the frame extension plate interconnected to a vehicle;

FIG. 28 is a bottom view of FIG. 27 showing the frame extension plate;

FIG. 29 is a rear elevation view of a vehicle showing the interconnection of the support tower to the vehicle;

FIG. 30 is a detailed view of FIG. 29;

FIG. 39 is a side elevation view showing a front and rear support scheme of one embodiment of the present invention; and FIG. 40 is a top plan view showing the configuration of FIG. 39.

Figure 1:
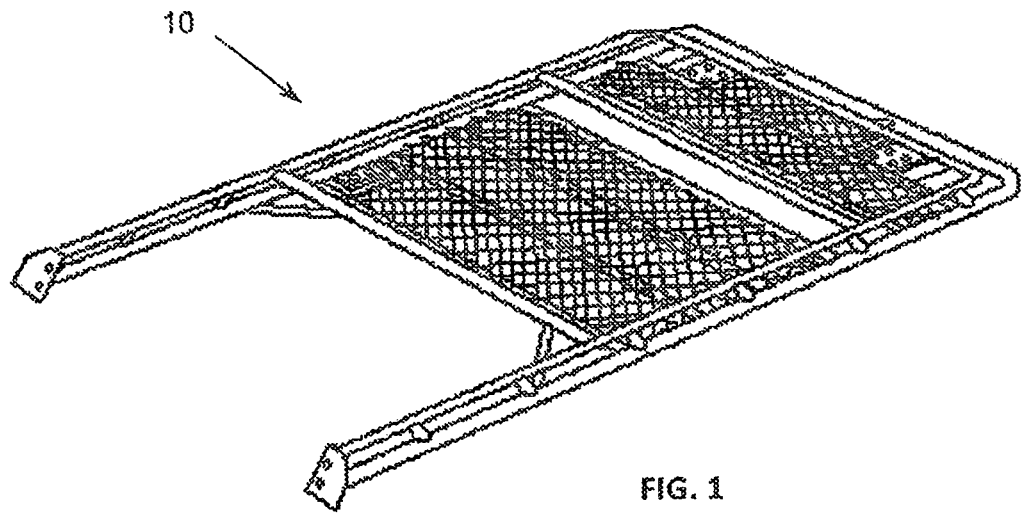
FIG. 1 is a perspective view of a roof rack of one embodiment of the present invention.
Figure 2:
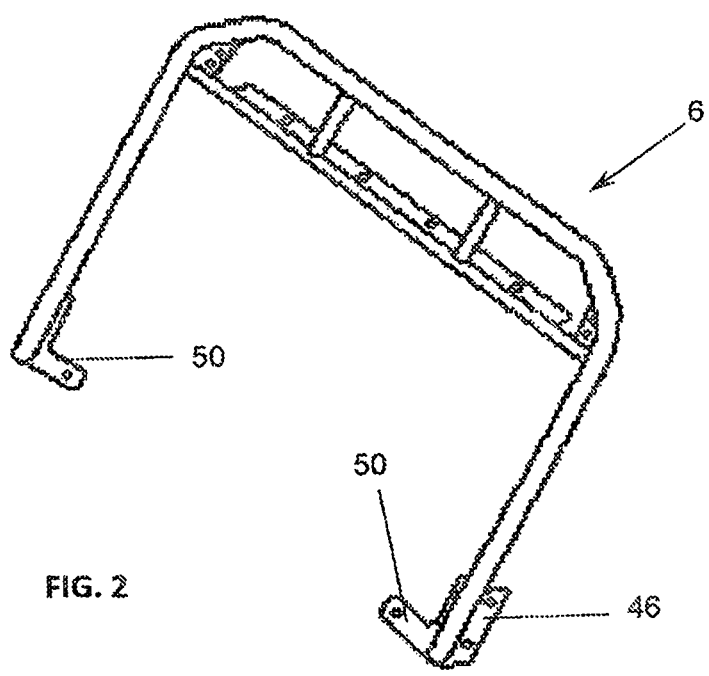
FIG. 2 is a perspective view of a front support of one embodiment of the present invention.

To assist in the understanding of one embodiment of the present invention the following list of components and associated numbering found in the drawings is provided herein:

| # | Component |
|---|---|
| 2 | Roof rack system |
| 6 | Front support |
| 10 | Roof rack |
| 14 | Rear support |
| 18 | Support tower |
| 22 | Vehicle |
| 26 | Roof |
| 30 | Windshield |
| 34 | Windshield frame |
| 38 | Light |
| 42 | Screw |
| 46 | Outer bracket |
| 50 | Inner bracket |
| 54 | Inner body |
| 58 | Outer body |
| 62 | Lip |
| 66 | Clamp portion |
| 70 | Pinch plate |
| 74 | Screw |
| 78 | Isolator |
| 82 | Wear plate |
| 86 | Support plate |
| 90 | Stud |
| 94 | Frame |
| 98 | Collar |
| 102 | Bolt |
| 106 | Washer |
| 110 | Shoulder washer |
| 114 | Flange |
| 118 | Bracket |
| 122 | Bolt |
| 126 | Isolator |
| 130 | Washer |
| 134 | Jam nut |
| 138 | Bolts |
| 142 | Nut |
| 149 | Plate |
| 150 | Roof rack plate |
| 154 | Ladder |
| 158 | Bracket |
| 162 | Clamp plate |
| 166 | Frame extension plate |
| 170 | Rear bumper end cap |
| 174 | Lower nut and washer |
| 178 | Carriage bolts |
| 182 | Rear frame |
| 186 | Tail pipe support |
| 190 | Rear bumper |
| 194 | Bumper bolt |
| 198 | Tail pipe |
| 202 | Inner body flange |

-continued

| # | Component |
|---|---|
| 206 | Inner body sheet metal wall |
| 210 | Sunroof Insert |
| 212 | Lower edge portion |
| 214 | Ear |
| 218 | Lower roof rack tube |
| 222 | Clamp |
| 226 | Bolt |
| 230 | Knob |
| 234 | Upper roof rack tube |
| 300 | Front support |
| 304 | Bumper |
| 308 | Vehicle tube |
| 312 | Windshield |
| 316 | Mounting plate |
| 320 | Clamp plate |
| 324 | Vehicle frame |
| 328 | Hole |
| 332 | Bolt |
| 340 | Clamp hook |
| 344 | Cover |
| 348 | Slot |
| 352 | Hole |
| 356 | Wear tape |
| 360 | Inner surface |
| 364 | Screws |
| 368 | Attachment plate |
| 372 | Weld |
| 400 | Bracket |
| 404 | Mounting bracket |
| 408 | Hole |
| 500 | Bracket |
| 504 | Rear support |
| 508 | Wear pad |
| 510 | Bolt |
| 514 | Hole |
| 600 | Ladder support |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-30, a convertible roof rack system 2 of one embodiment of the present invention is shown. More specifically, the convertible roof rack system 2 is comprised of a front support 6, a roof rack 10, a rear support 14, and support towers 18 that are all operably interconnected to a vehicle 22. The roof rack 10 is placed above the roof 26 of the vehicle 22 and adjacent to a rear end and windshield 30 thereof. The rear support 14 is rotatably interconnected to the support towers 18 and, thus, is able to move from a first position of use adjacent to the roof 26 to a second position of use away from the vehicle 22. A front end of the roof rack 10 is selectively interconnected to the front support 6, which is firmly interconnected on the windshield frame 34 adjacent to the windshield 30 of the vehicle 22. Thus, the roof rack 10 may be rotated away from the roof 26 of the vehicle 22 while the front support 6 remains in place.

Figure 7:
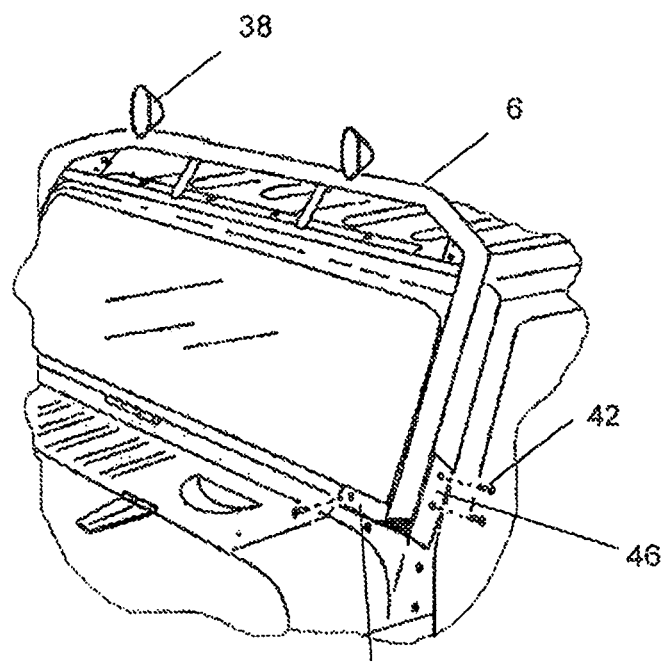
FIG. 7 is a perspective view of the vehicle shown in FIG. 6 with interconnected front support.
Figure 8:
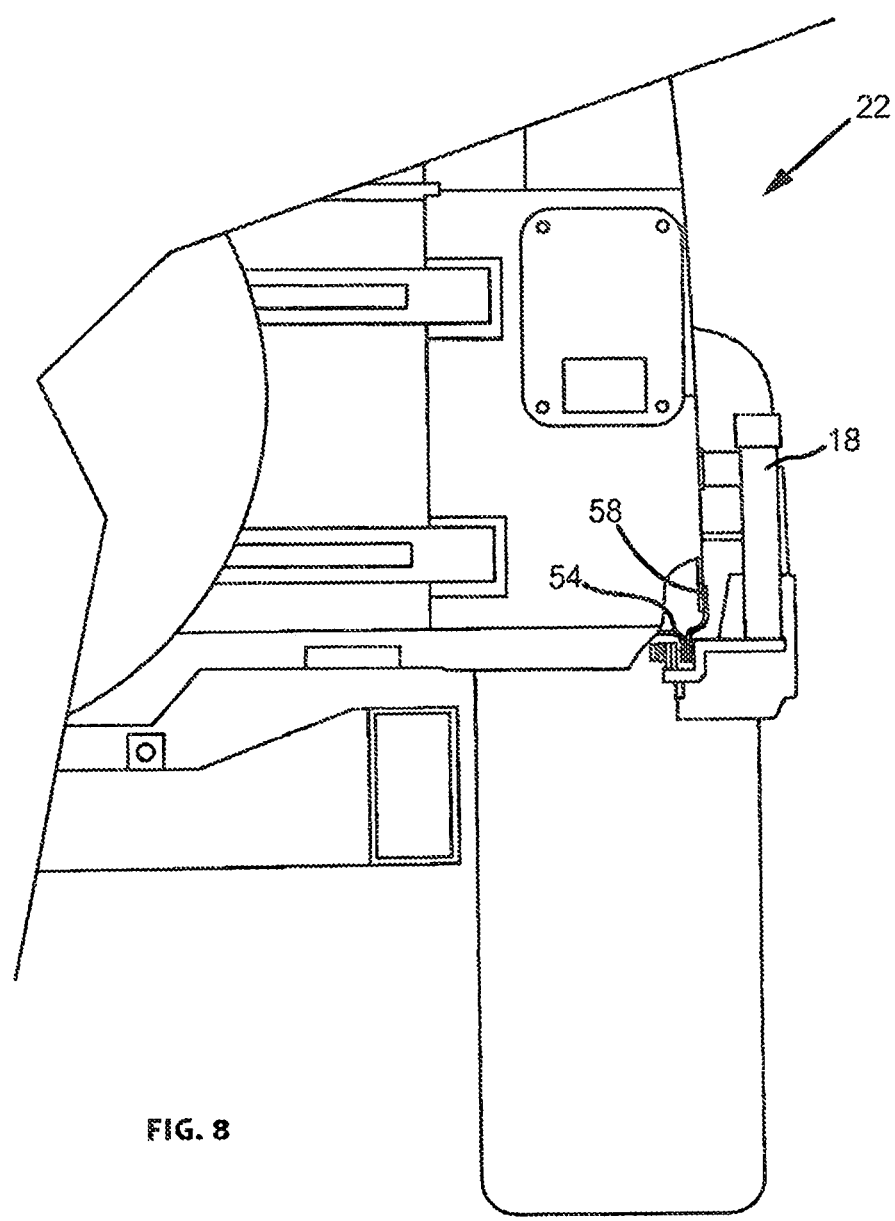
FIG. 8 is a rear elevation view of the vehicle with an interconnected support tower.
Figure 9:
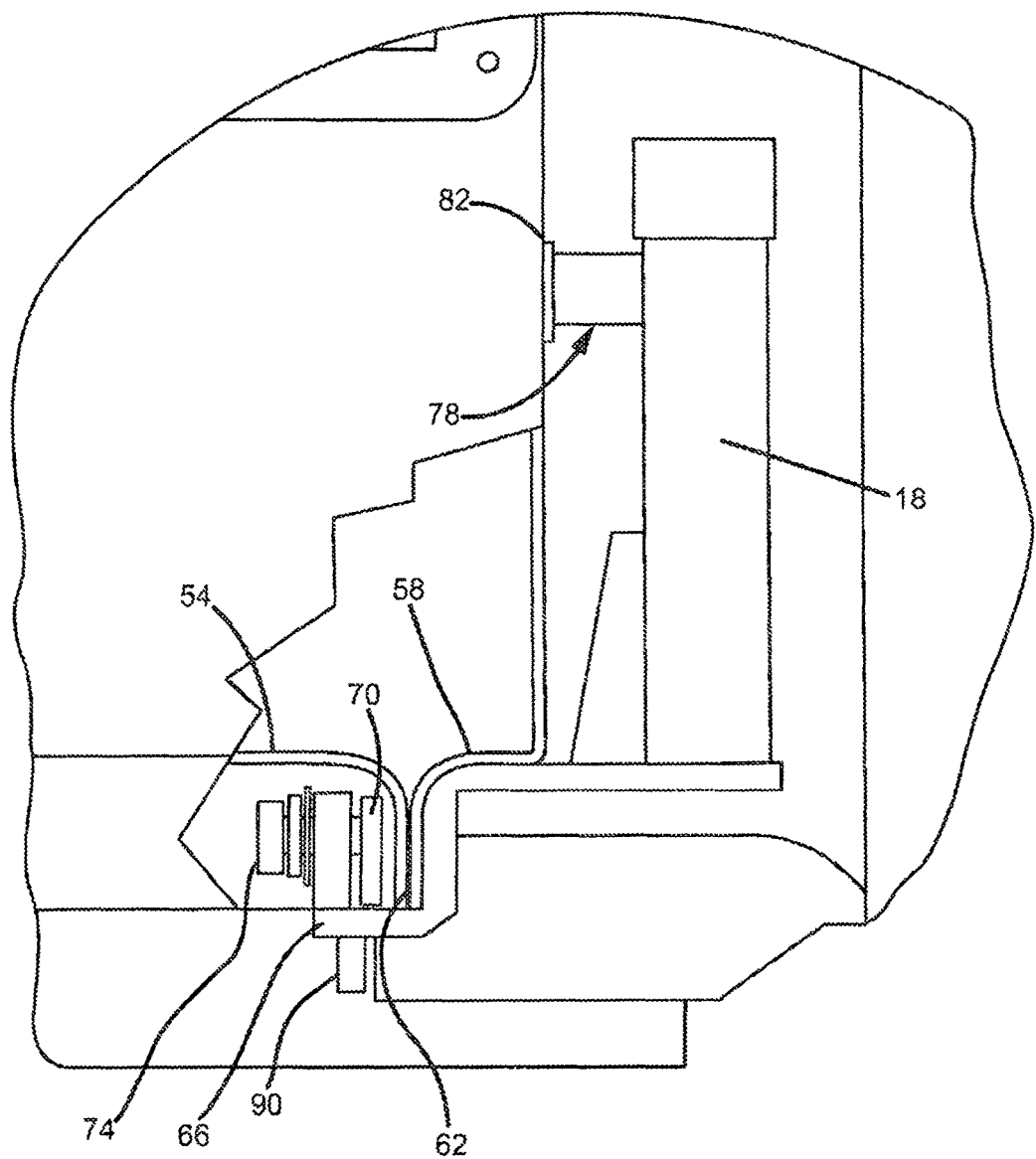
FIG. 9 is a detailed view of FIG. 8 showing the support tower interconnection.
Figure 10:
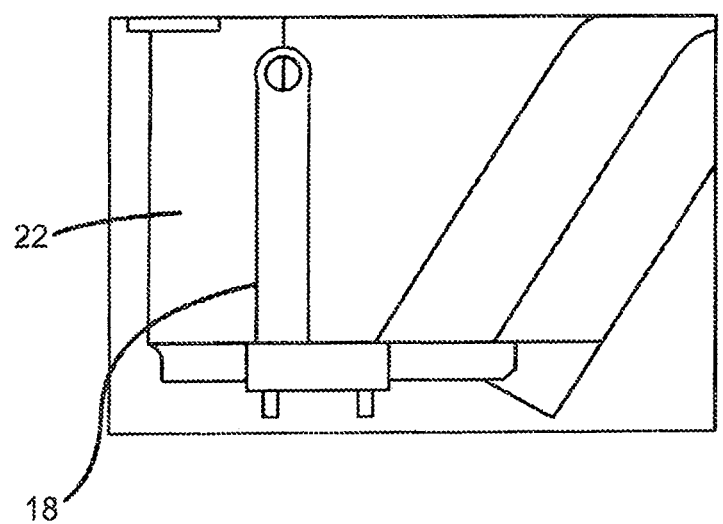
FIG. 10 is a side elevation view of FIG. 9.

Referring now to FIGS. 2, 6, 7, and 20-23 the front support 6 of one embodiment of the present invention is shown. In FIG. 7, lights 38 are shown interconnected to the front support 6 in the remaining other views of the application, the lights are not employed or are omitted for clarity. One skilled in the art will appreciate that any number of lights 38 or other electronic componentry, such as speakers, neon lights, signs, etc., may be associated with the front support 6 in any fashion without departing from the scope of the invention. The front support 6 is adapted to be interconnected to lights 38 of various sizes and shapes. For example, in FIG. 22, lights 38 are rectangular and in FIG. 23, lights 38 are circular.

The front support 6 is a tubular structure interconnected to the windshield frame 34 adjacent to the vehicle windshield 30. Some vehicles 22 include a plurality of screws 42 located adjacent to the windshield 30 and positioned about the windshield frame 34. In operation, the screws 42 are removed and replaced or reused to interconnect an outer bracket 46 and an inner bracket 50 of the front support 6 to the windshield frame 34. Thereafter, wires associated with electronic components to be interconnected to the front support 6 are interconnected to the vehicle power source. In one embodiment, an electrical connector is associated with the front support and the electrical connector is in electrical communication with the power source of the vehicle 22.

FIGS. 4 and 8-11 show the interconnection of the support towers 18 to the vehicle. Vehicles 22, to which embodiments of the present invention are preferably interconnected, include an inner body 54 and an outer body 58 that are interconnected to form a downwardly extending lip 62. The support tower 18 of embodiments of the present invention includes a clamp portion 66 that includes a pinch plate 70 and is associated with a screw 74. In operation, tightening of the screw 74 sandwiches the lip 62 between the clamp portion 66 of the support tower 18 and the pinch plate 70 to hold the support tower 18 in place. It should be understood, however, that in some instances drilling of holes may be required to interconnect the support tower or other components described herein. The support tower 18 may also include a load isolating member, i.e., an isolator 78, which is interconnected between the support tower 18 and a wear plate 82 adhered to the vehicle 22. In operation, vibrational loads associated with a support tower 18 are transferred through the isolator 78 to the wear plate 82, thereby protecting the vehicle 22. The isolator 78 of one embodiment is made of nylon. One of ordinary skill in the art will appreciate that the support tower may be omitted wherein the rear support is selectively interconnected to a base plate 84 associated with the clamp portion 66.

Figure 5:
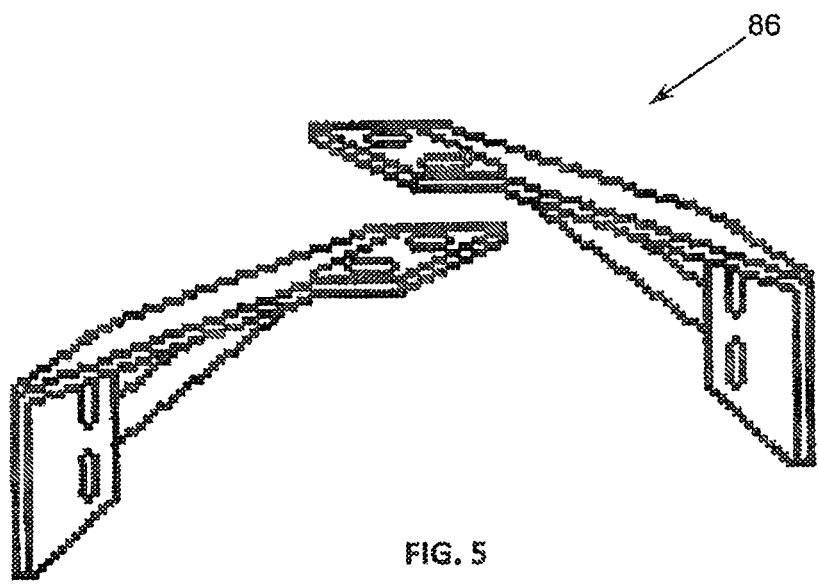
FIG. 5 is a perspective view of support plates of one embodiment of the present invention.
Figure 6:
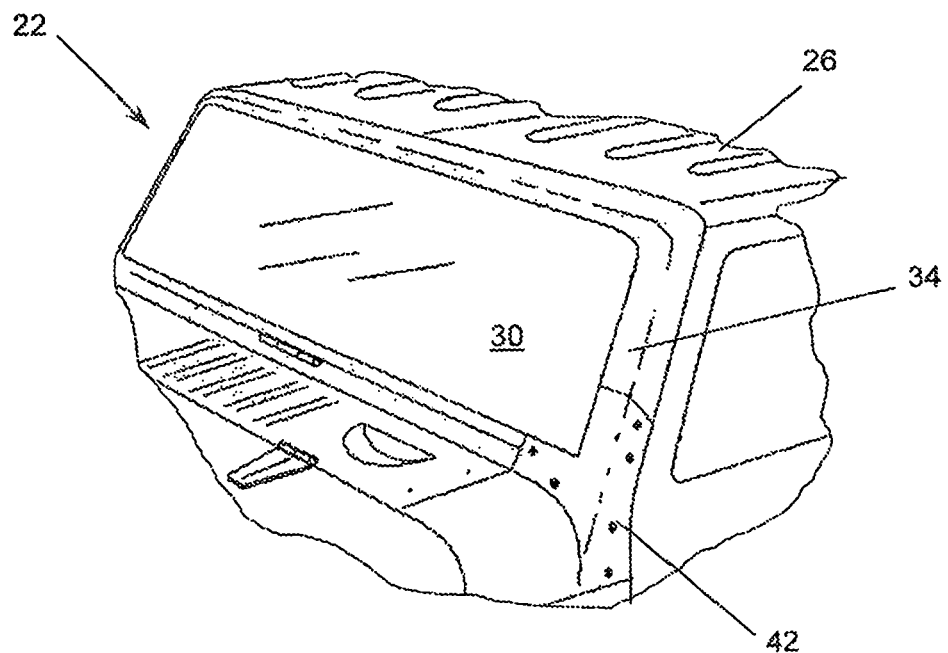
FIG. 6 is a partial perspective view of a front portion of a vehicle that receives the roof rack of one embodiment of the present invention.
Figure 11:
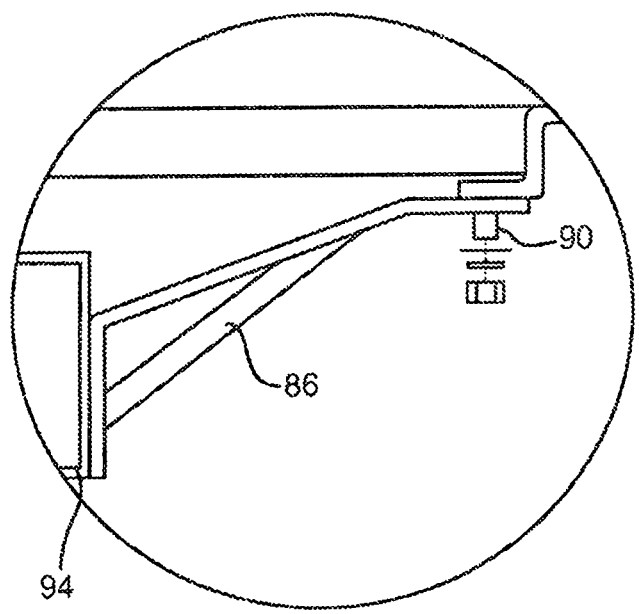
FIG. 11 is a detailed view similar to that of FIG. 9 wherein a support plate is additionally interconnected to the support tower.

Referring now to FIGS. 5 and 11, to further strengthen the interconnection between the support tower 18 and the vehicle 22, a support plate 86 may be utilized. The support plate 86 interconnects to a stud 90 of the support tower 18 on one end and to a frame 94 of the vehicle 22 on the other end. It is contemplated that the interconnection with the frame 94 is achieved by utilizing holes and fasteners normally used to interconnect the bumper (not shown) to the vehicle 22. That is, bumpers of many vehicles are interconnected to the frame by a plurality of bolts and it is contemplated that the existing bolts be removed to interconnect the support plates 86 to the frame 94. Thereafter, a bracket (not shown) is utilized that shares those bolts and provide a location for the re-interconnection of the bumper to the frame 94. The support plate 86 thus allows bending loads that would force the support tower away from the vehicle to be transferred directly to the frame 94. One of skill in the art will appreciate that the towers 18 may be omitted where the rear support 14 is alternatively interconnected to the support plates 86.

Figure 3:
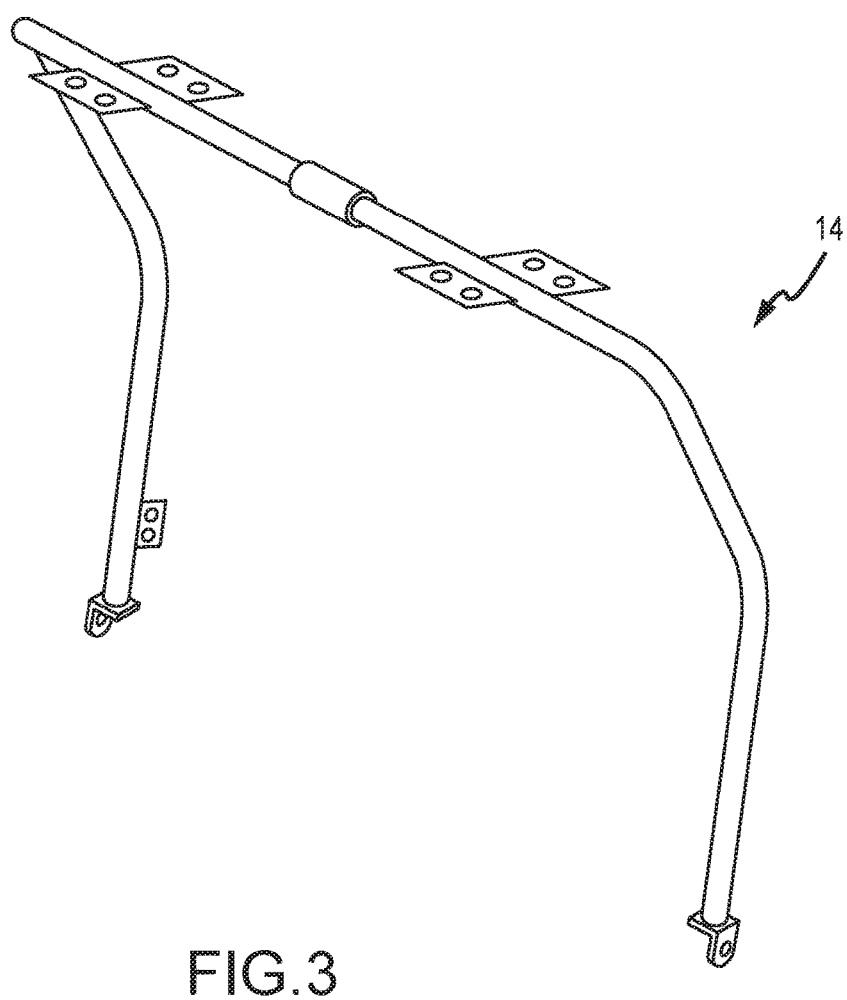
FIG. 3 is a perspective view of a rear support of one embodiment of the present invention.
Figure 4:
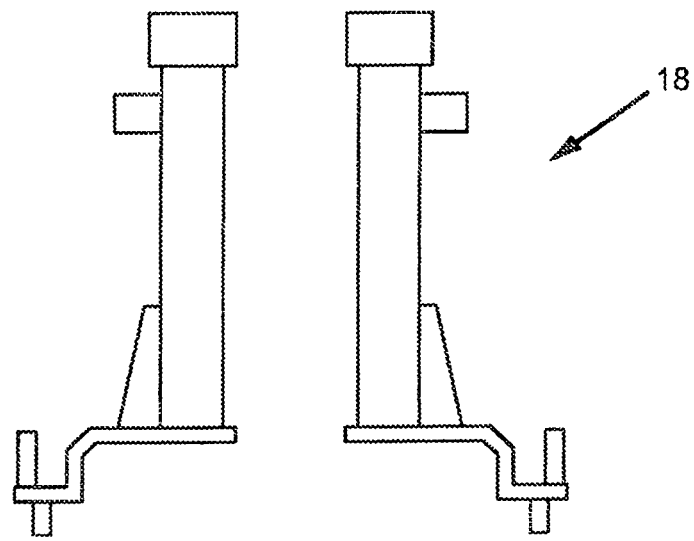
FIG. 4 is a front elevation view of support towers of one embodiment of the present invention.
Figure 12:
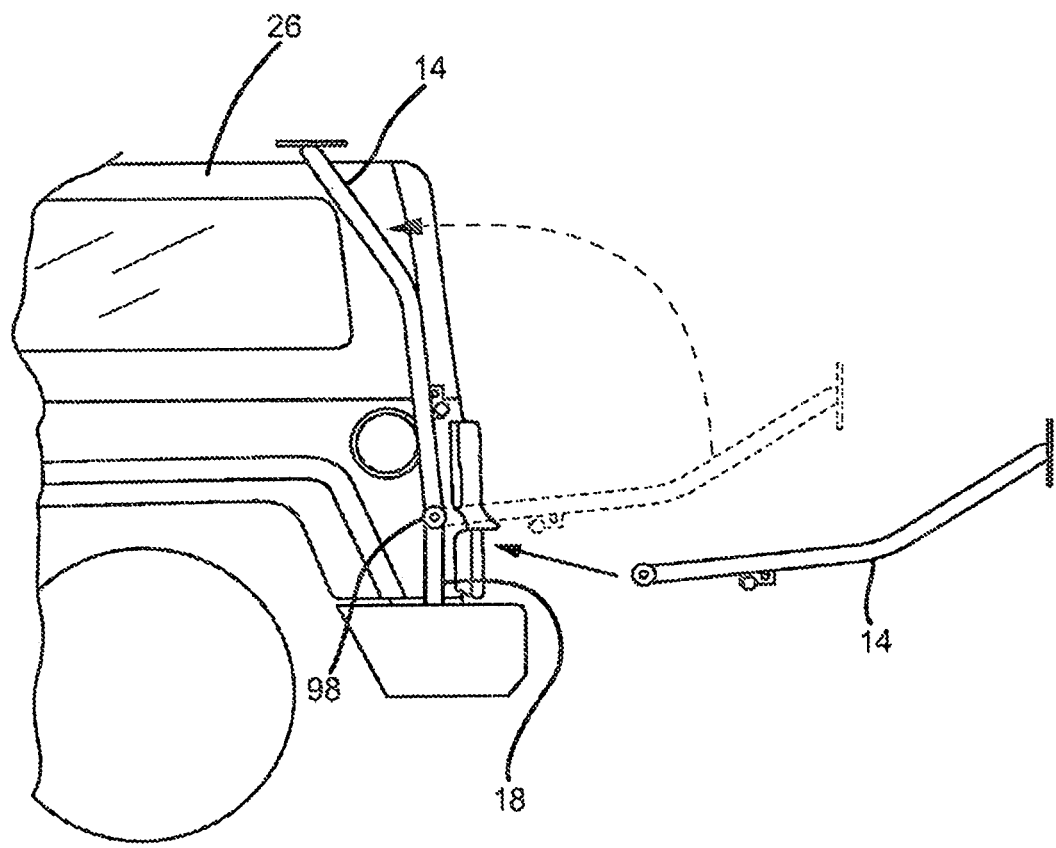
FIG. 12 is a side elevation view of the vehicle and rear support shown in two positions of use.
Figure 13:
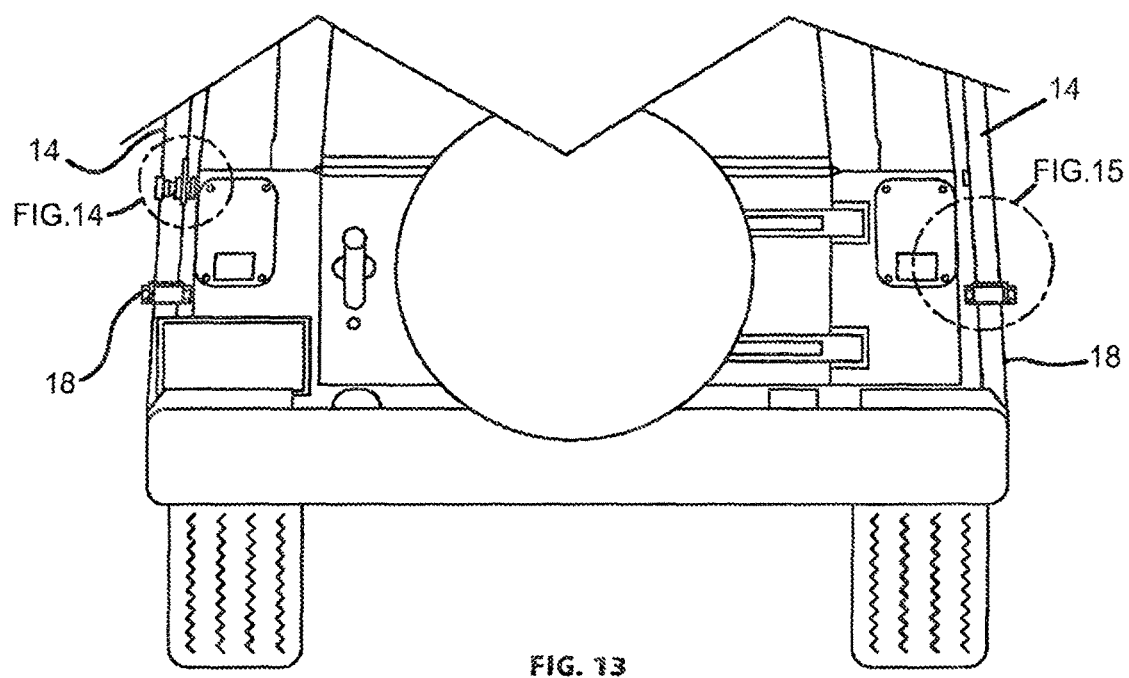
FIG. 13 is a rear elevation view of the vehicle showing the interconnected support bar.
Figure 15:
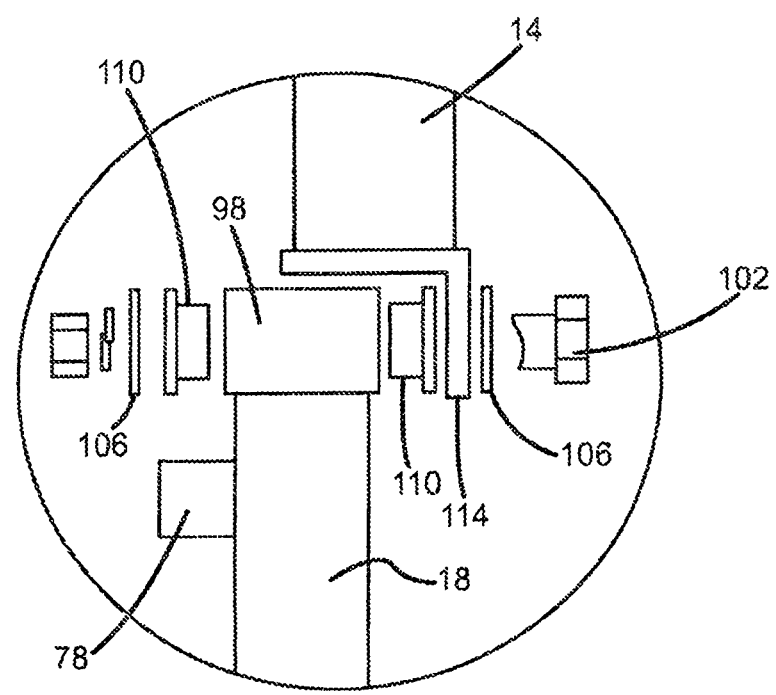
FIG. 15 is a detailed view of FIG. 13.

Referring now to FIGS. 3, 12 and 15, the rear support 14 is shown that interconnects to the rear of the vehicle rack 10, and is rotatably interconnected to the support towers 18. The support tower 18 includes a collar 98 that receives ends of the rear support 14 which is held in place by a bolt 102 associated with a washer 106 with a plurality of shoulder washers 110 therebetween. One of ordinary skill in the art will appreciate that other interconnection methods, such as a clevis, may be employed without departing from the scope of the invention. The bolt 102 interconnects a flange 114 of the support bar 14 with the bolt 102 resting within the collar 98 of the support flange 114. Thus, the rear support 14 is capable of moving from a first position of use adjacent to the roof 26 of the vehicle 22 to a second position of use away therefrom.

Figure 14:
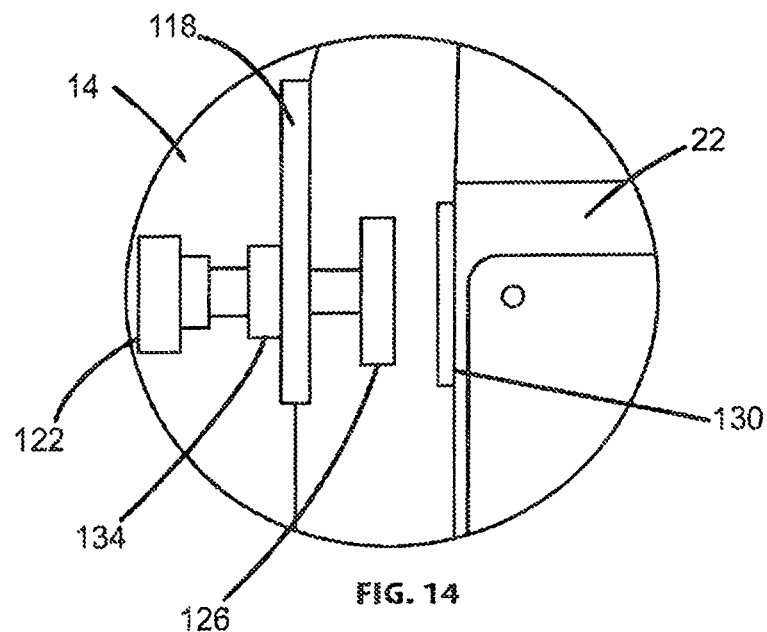
FIG. 14 is a detailed view of FIG. 13.

Referring to FIG. 14, to further reduce sway of the roof rack, the rear support 14 may also include a bracket 118 that receives a bolt 122 with an interconnected isolator 126. In one embodiment of the present invention, the isolator 126 is made of rubber and interacts with a washer 130 or wear plate that is interconnected to the vehicle 22 with adhesive. A jam nut 134 may also be used to ensure that the isolator 126 remains firmly associated with the washer 130. The isolator 126 may be interconnected anywhere along the length of the rear support 14 so long contact is made with the vehicle or associated wear plate.

Figure 16:
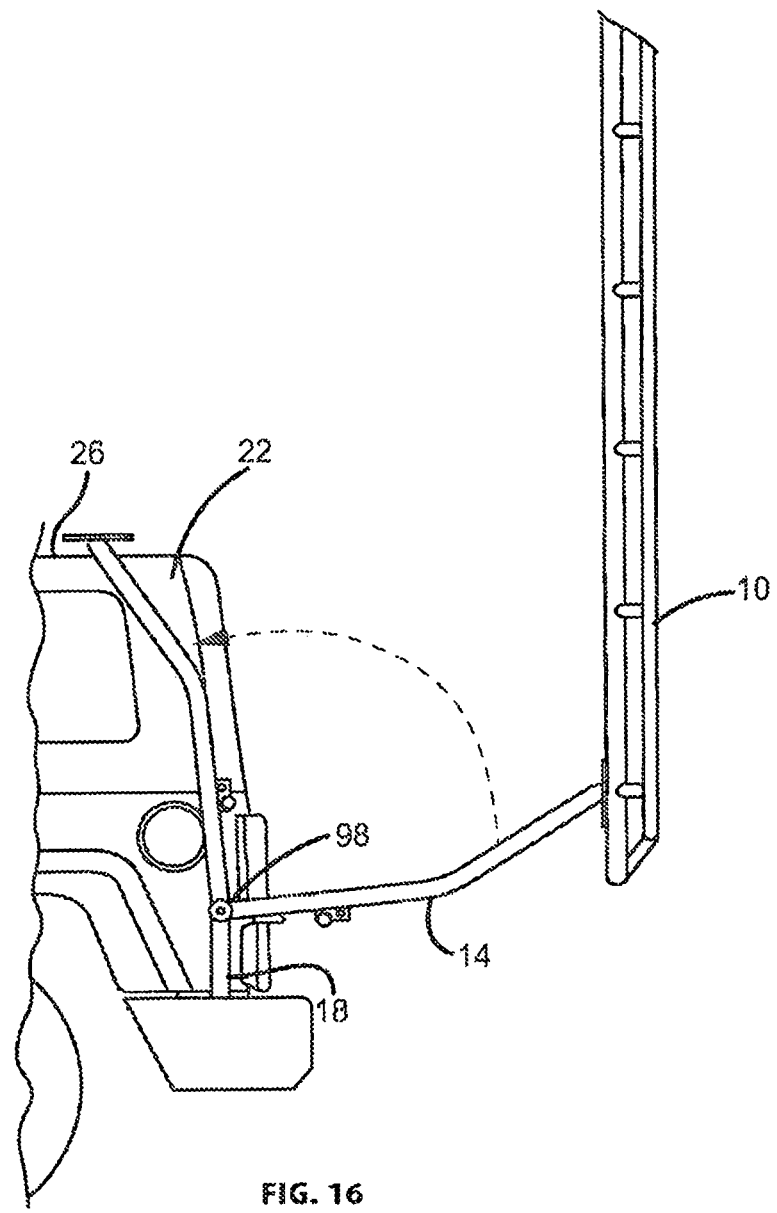
FIG. 16 is a side elevation view of a vehicle with interconnected support bar and vehicle rack.
Figure 17:
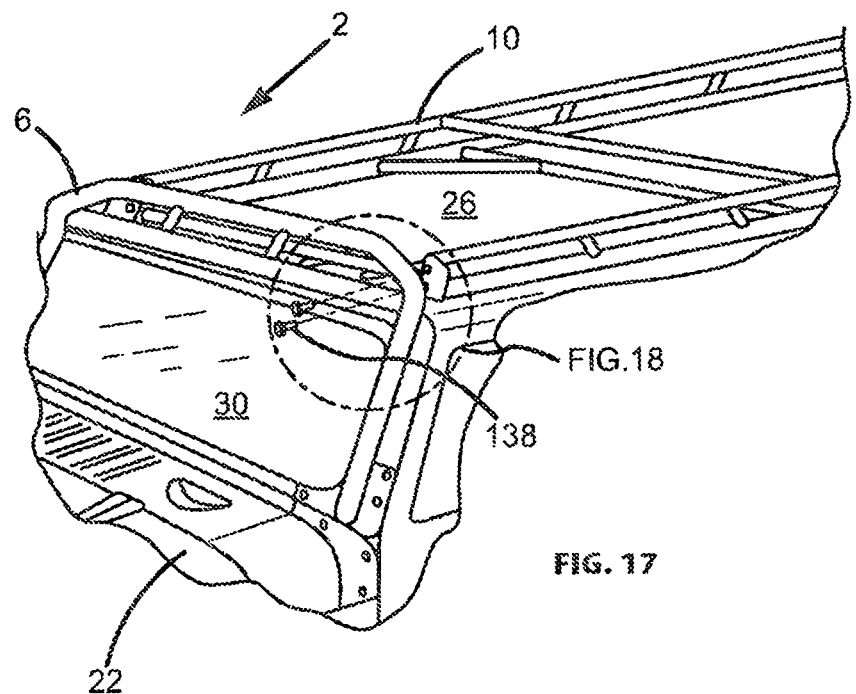
FIG. 17 is a partial perspective view of the vehicle rack interconnected to the front support.
Figure 18:
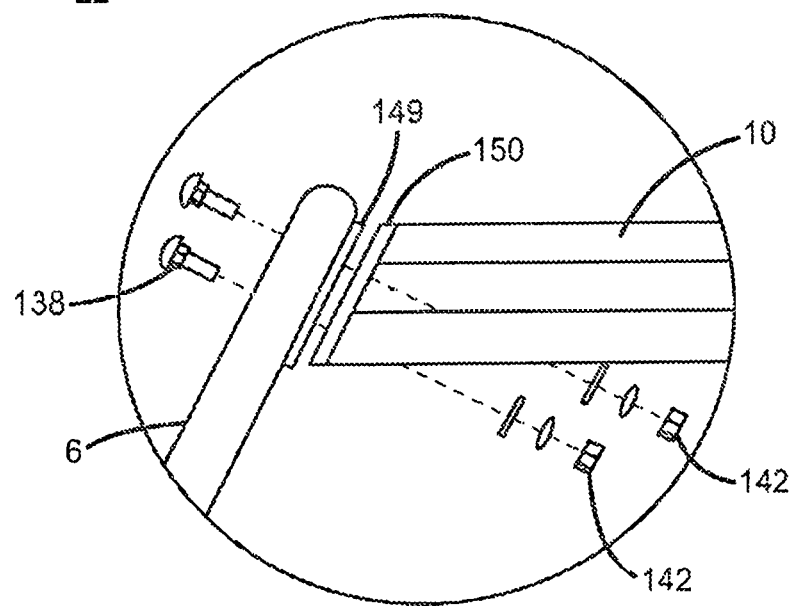
FIG. 18 is a front detail view of FIG. 17.

The operation of one embodiment of the present invention is shown in FIGS. 16-18. The roof rack 10 is interconnected to the rear support 14, which is rotatably interconnected to the support towers 18. To move the roof rack 10 to the first position of use adjacent to the roof 26, one would push the rear support 18 and rotate the roof rack 10 towards the roof 26 of the vehicle 22. It is important to note that the roof rack 10 in the second position of use may be supported by a piece of wood or other items positioned on the ground. More preferably, however, a lanyard (not shown) is interconnected to the front support 6 on one end and to the roof rack 10 on the other end, to prevent over-rotation of the roof rack 10 past its second position of use. After the roof rack 10 is placed in the first position of use, as succinctly shown in FIG. 17, the bolts of FIG. 14 are tightened to place the isolators in contact with the washers, thereby substantially reducing sway of the roof rack 10.

Finally, the roof rack is interconnected to the front support 6 as shown in FIGS. 17 and 18 by way of a plurality of bolts 138 and nuts 142 that are used to interconnect a plate 149 to a roof rack plate 150. One of ordinary skill in the art will appreciate that an additional lanyard or safety mechanism may be included to keep the roof rack 10 interconnected to the front support if the bolts 138 become loose. Although a traditional nut 142 and bolt 138 configuration is shown in FIG. 18, one skilled in the art will appreciate that a bolt 138 with a larger head that facilitates hand tightening may be used (such as shown in FIG. 14) to facilitate use of the convertible roof rack without tools.

Figure 19:
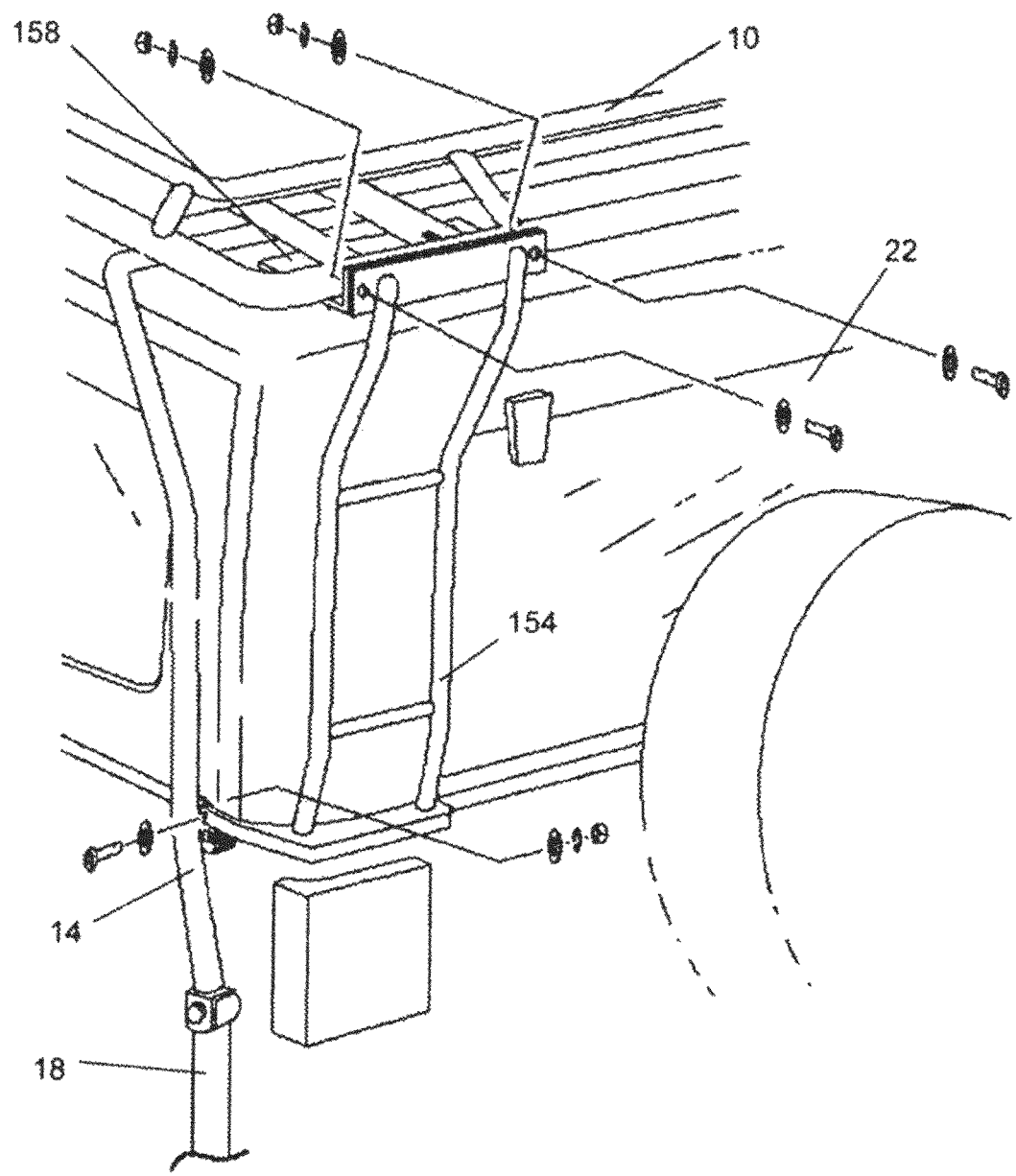
FIG. 19 is a rear perspective view of the roof rack system of one embodiment of the invention with an optional ladder interconnected thereto.
Figure 20:
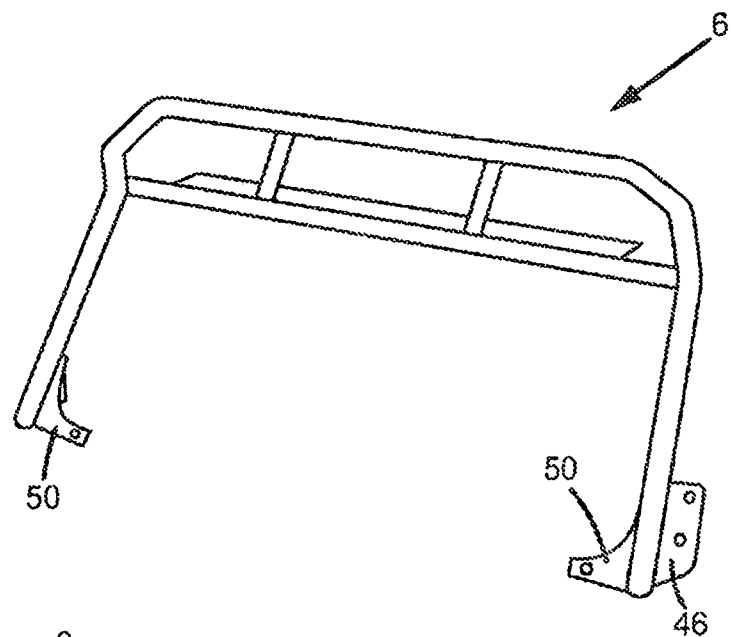
FIG. 20 is a perspective view of a front support of another embodiment of the present invention.
Figure 21:
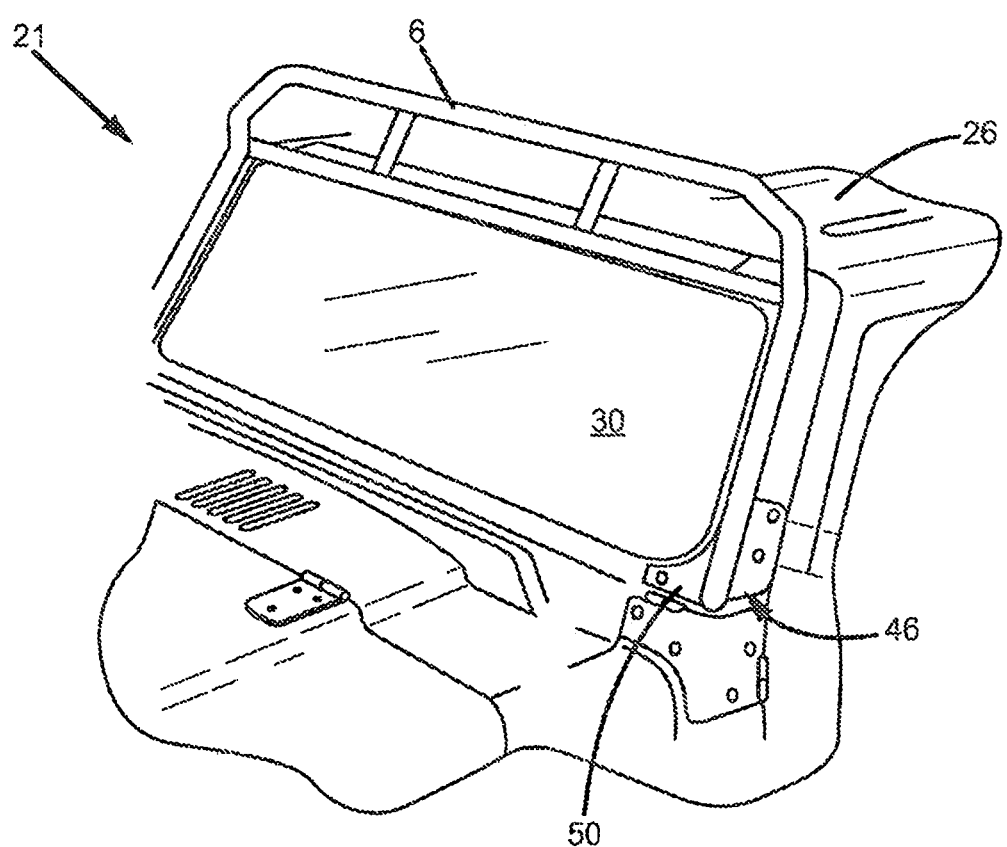
FIG. 21 is a partial perspective view of a vehicle of one embodiment of the present invention with the front support of FIG. 20 interconnected thereto.
Figure 22:
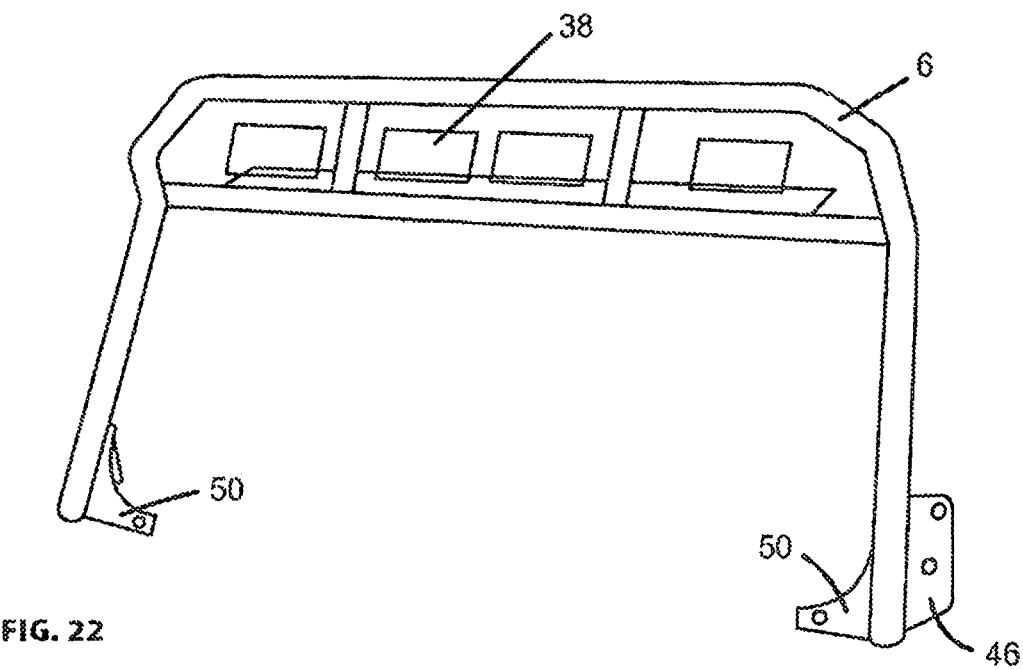
FIG. 22 is a perspective view of the front support of FIG. 20 with lights interconnected thereto.
Figure 23:
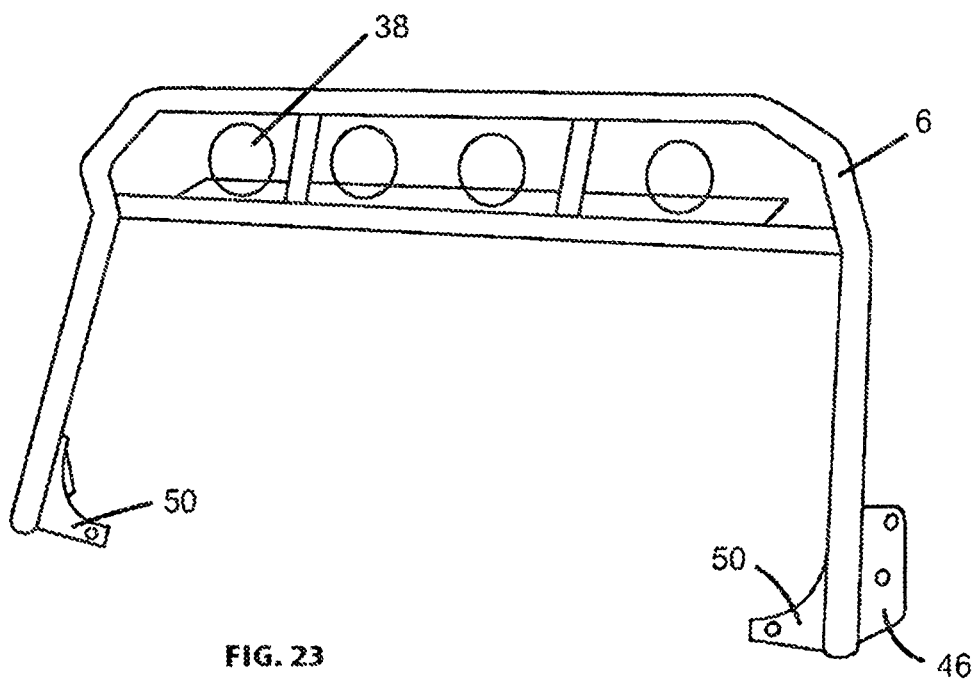
FIG. 23 is a perspective view of the front support of FIG. 20 with lights of another embodiment interconnected thereto.

FIG. 19 shows an optional ladder 154 interconnected to the roof rack system 2 of one embodiment of the present invention. The ladder 154 is interconnected to the roof rack 10 by way of a bracket 158 and to the rear support 14 such that the ladder 154 will travel with the roof rack 10 and the rear support 14. Stated differently, the ladder 154 shown is interconnected only to the roof rack 10 and associated support structure such that it moves with the roof rack. Those of ordinary skill in the art will appreciate, however, that the ladder 154 may be interconnected to the vehicle and the roof rack 10 such that the user must disconnect the ladder 154 from the vehicle or the roof rack 10 before moving the roof rack 10. In addition, as the ladder 154 further interconnects the roof rack 10 to the rear support 14, enhanced stiffening is provided and sway is reduced. One of ordinary skill in the art will appreciate that the ladder 154 may be interconnected on the left side of the vehicle 22, the right side, or two ladders may be provided. The contemplated ladder does not interfere with any moving or stationary part of the vehicle such as a swing gate tire carrier, rear tail lights, rear window openings, etc.

To accommodate some vehicle types, a frame extension may be required, which is shown in FIGS. 24-30. That is, in some instances the support plate 86 (see FIG. 11) does not easily interface with the vehicle frame and an extension is required. The extension is comprised of a clamp plate 162 and a frame extension plate 166 that are interconnected to the vehicle's rear frame 182. To interconnect the frame extension plate 166, a rear bumper end cap 170 is removed from the rear bumper 190 by disengaging a lower nut and washer 174. The clamp plate 162 is then positioned behind the rear frame 182 and secured with carriage bolts 178 to the frame extension plate 166 by nuts and washers 198 threaded onto the carriage bolts 178. The clamp plate 162 is preferably positioned to the rear of the exhaust tail pipe support 186 proximate to the tail pipe 198. The frame extension plate 166 is also interconnected to the bumper bolt 194 with the lower nut and washer 174. In a preferred embodiment, NYLOK® nuts, e.g., locking nuts that include a nylon collar insert, are used to fasten the frame extension plate 166.

The frame extension plate 166 may be adjustably positioned to a desired distance away from the frame 182. In one embodiment, the spacing between the frame 182 and the frame extension plate 166 is about 2⅝ inches. Similar to the embodiments described above, the support tower 18 includes a clamp portion 66 that includes a pinch plate 70. The pinch plate 70 is positioned onto an inner body flange 202 such that it rests flush against the inner body sheet metal wall 206 and on a lower edge portion 212. In operation, tightening the screw 74 sandwiches the pinch plate 70 between the inner body sheet metal wall 202 and the clamp portion 66 to hold the support tower 18 in place. In embodiments of the present invention, the screw 74 is associated with lock washers and/or flat washers. To enhance the interconnection of the support tower 18 to the vehicle, a support plate (see FIG. 11) may be interconnected to the frame extension 166 and the support tower.

Figure 31:
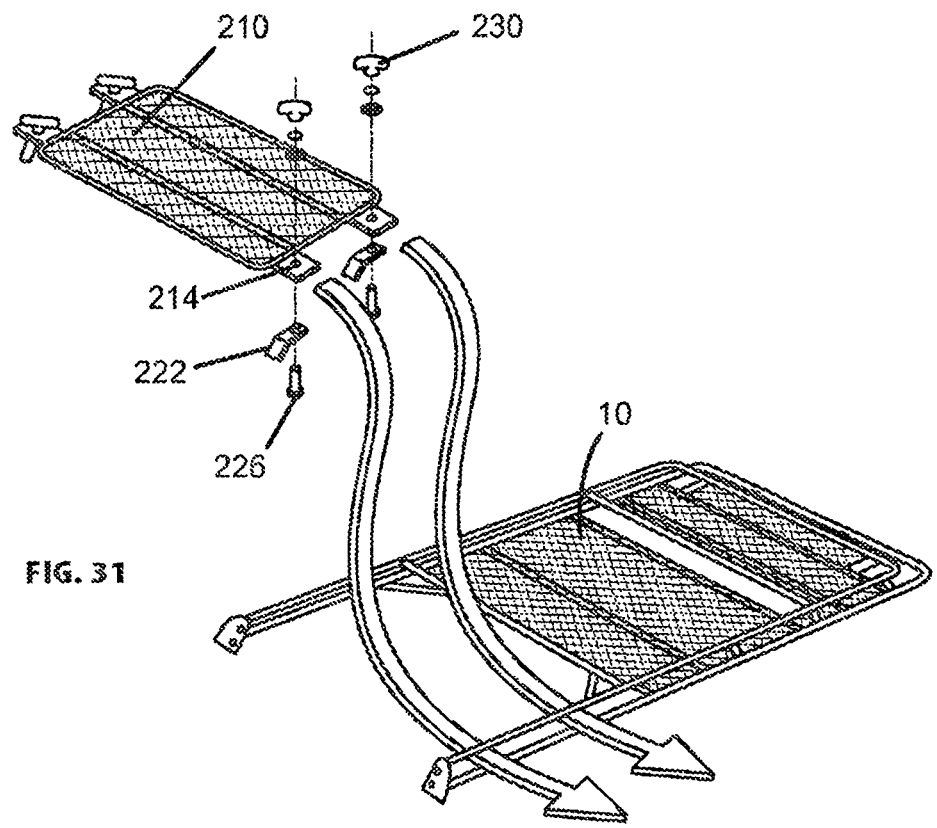
FIG. 31 is a perspective view of a sun roof insert that optionally interconnects to the roof rack.
Figure 32:
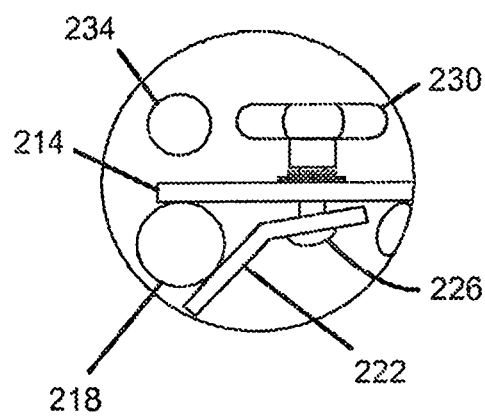
FIG. 32 is a detailed view of FIG. 31 showing the interconnection of the insert to the roof rack.

FIGS. 31 and 32 show a sunroof insert 210 that provides additional storage space for selective interconnection to the roof rack 10 adjacent to the location of a vehicle sunroof. The sun roof insert 210 of one embodiment of the present invention includes a plurality of ears 214 that engage a lower roof rack tube 218 of the roof rack 10. The ears 214 work in conjunction with a clamp 222 to interconnect the sun roof insert 210 to the roof rack 10. That is, the ears 214 and the clamp 222, with the bottom roof rack tube 218 therebetween, receive a bolt 226 that is hand-tightened by a knob 230 to affix the sunroof insert 210 to the roof rack 10. One of skill in the art will appreciate that other interconnection techniques and methods may be used without departing from the scope of the invention.

FIGS. 33-36 show a front support 300 of another embodiment of the present invention. The front support 300 utilizes supplemental devices to enhance contact to the vehicle frame, which provides additional lateral support to prevent or reduce roof rack vibration and swaying. Here, a bumper 304 is employed on vertical tubes 308 of the front support 300 that contact the vehicle frame adjacent to the front windshield 312. In addition, the front support 300 includes mounting plates 316 that interface with a clamp plate 320 also interconnected to the vehicle frame 324. In operation, the clamp plate 320 is used to bias the vertical tubes 308 of the front support 300 and compress the bumpers 304 to increase front support stiffness. The mounting plate 316 is welded to a vertical tube 308 of the front support 300. The mounting plate 316 includes holes 328 that receive bolts 332 that maintain the position of a clamp hook 336. The clamp hook 340 includes a portion that engages an inner portion of the vehicle frame 324.

Again, a bumper 304 is interconnected to the vertical tube 308 and selectively contacts the vehicle frame 324 or a cover 344 placed on the vehicle to prevent marring or scratching by the bumper 304. In operation, after the clamp hook 340 is placed on the frame and the mounting plate 316, a user biases the vertical tube 308 towards the vehicle frame 324 which compresses the bumper 304. One of ordinary skill in the art will appreciate a rigid contact member can be used instead of a resiliently-deflectable bumper. In this embodiment, the contact member is biased towards the vehicle as described herein, wherein the cover isolates the contact member from the vehicle. Alternatively, the cover can include a bumper or a contact member that engages the vertical tubes 308.

Figure 35:
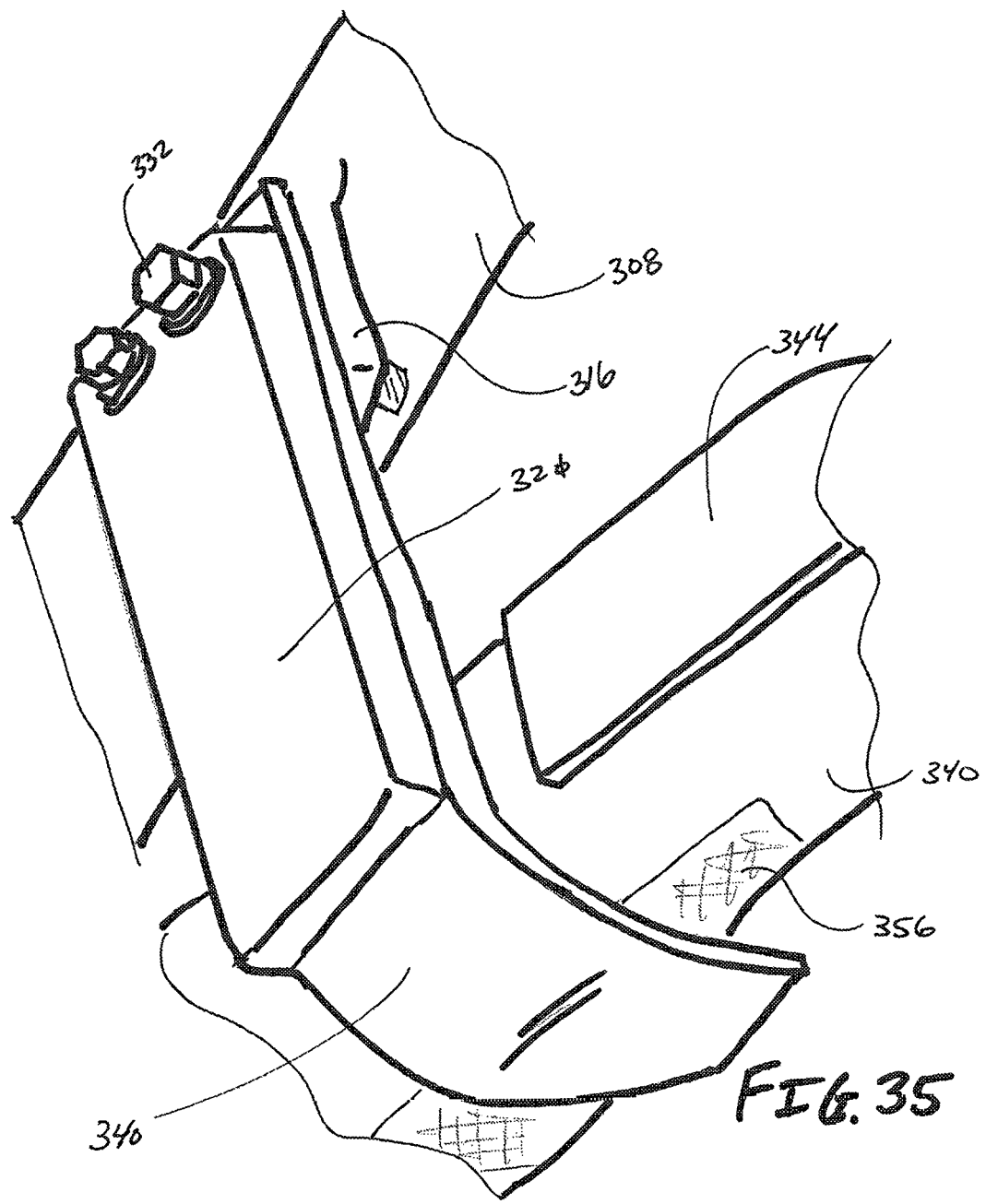
FIG. 35 is a another detailed view of FIG. 33.

The clamp plate 320 is then placed over the clamp hook 340, which is positioned between the mounting plate 316 and the clamp plate 320. Holes 328 in the mounting plate 316 are aligned with slots 348 in the clamp hook 340. Holes 352 in the clamp plate 320 are aligned with the mounting plate holes 378 and the clamp hook slots 348 and at least one bolt 332 is used to secure the clamp plate 320 and clamp hook 340 to the mounting plate 316 as shown in FIG. 35.

One of ordinary skill the art will appreciate that the slotted holes 348 provided in the clamp hook 340 may be single holes or series of holes. Furthermore, the holes 328 provided in the mounting plate 316 may be threaded, which would omit the need for nuts to secure the bolts 332. Furthermore, some embodiments of the present invention employ wear tape 356 positioned on the inner surface 360 of the vehicle frame 324 that receives the clamp hook 340.

Figure 33:
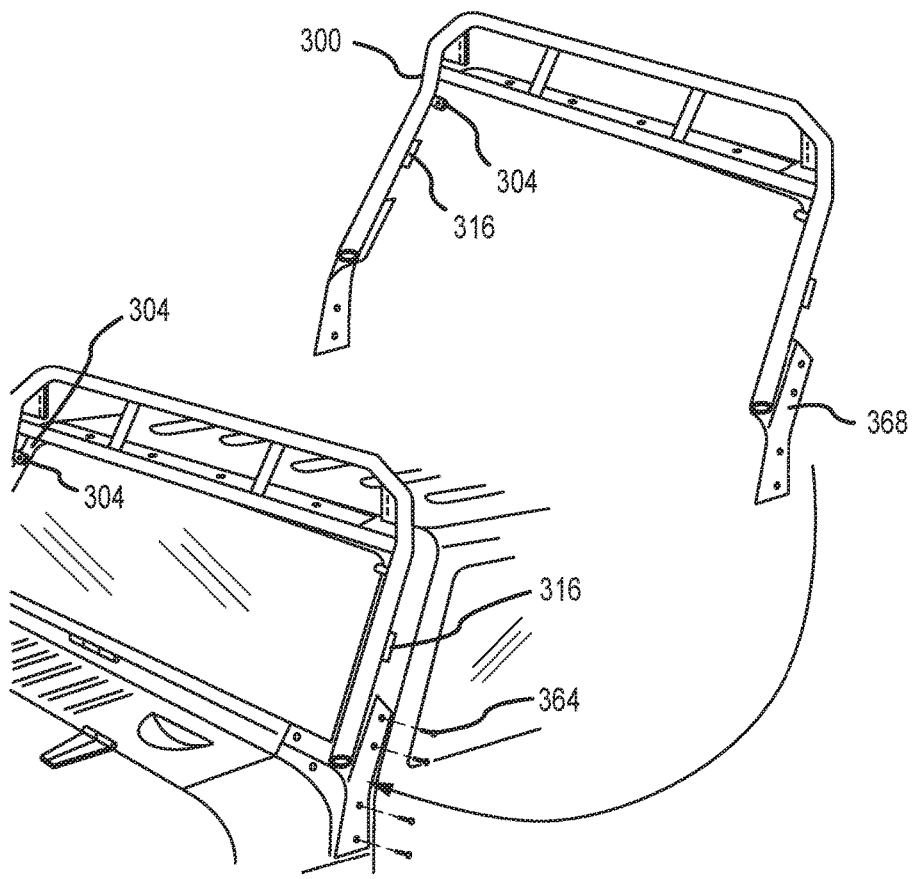
FIG. 33 is a perspective view showing a front support of another embodiment of the present invention.

As shown in FIG. 33, screws 364 that interconnect a lower portion of the window frame to the doorframe are removed and the front support 300 is installed on both the passenger and driver sides of the vehicle. The screws 364 that were previously found in the frame are replaced with new screws that attach an attachment plate 368 of the front support 300 to the vehicle. Again, in this way no new vehicle penetrations are made. Interconnecting the front support 300 to the vehicle in this matter also places the bumper in contact with the cover as shown in FIG. 36.

Figure 36:
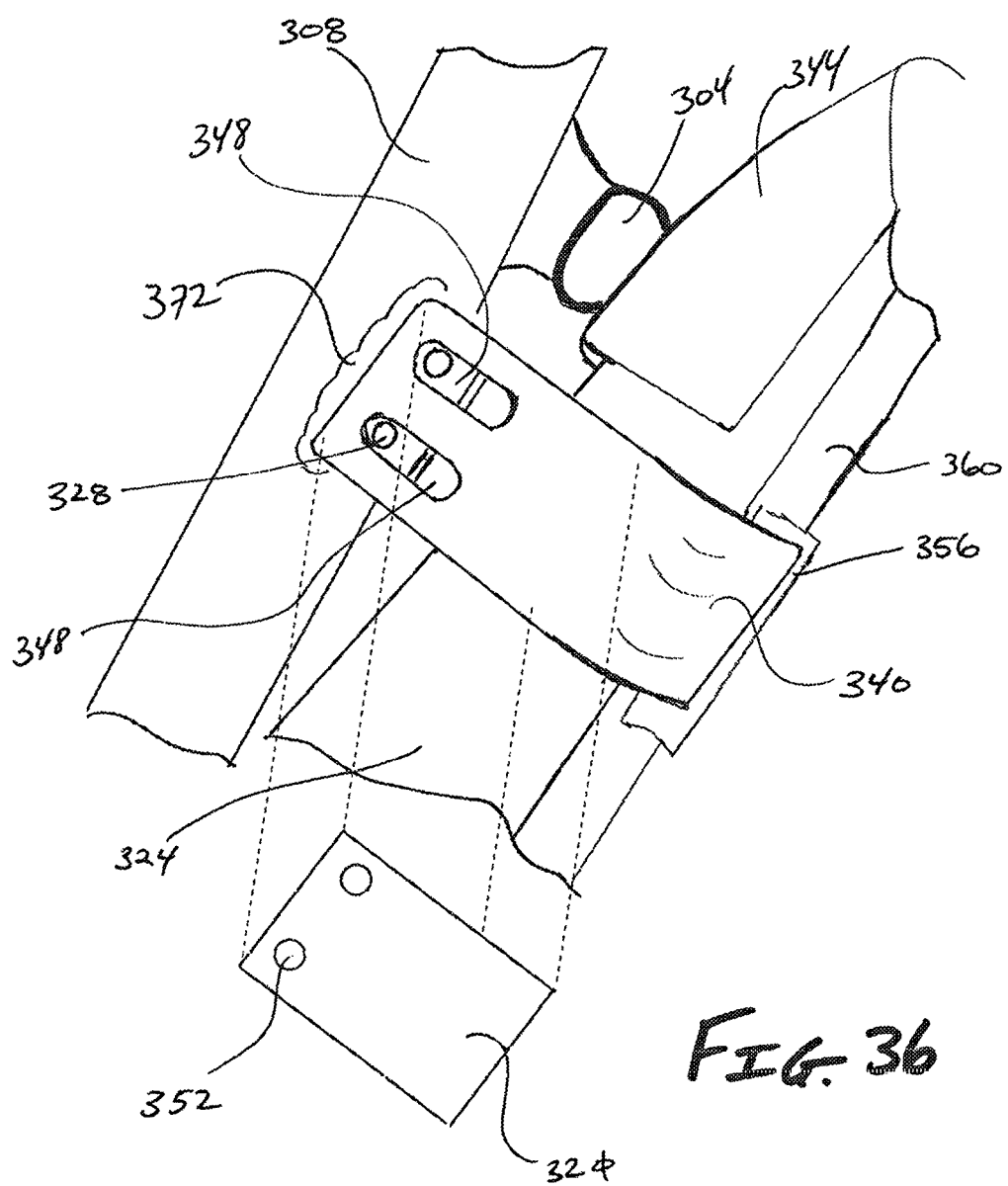
FIG. 36 is a side elevation view of FIG. 33.

Next, as shown in FIG. 36, the clamp plate 300 is placed in contact with the mounting plate 316 welded 372 to the vertical tube 308 of the front support 300 and the slots 348 thereof are aligned with holes 328 in the mounting plate 316. This also places the hooked portion of the clamp hook 340 in contact with an inner surface 360 of the frame 324. Again, a wear tape 356 may be placed at the contact the location of the clamp hook 340 to the inner surface 360 to prevent marring.

Figure 34:
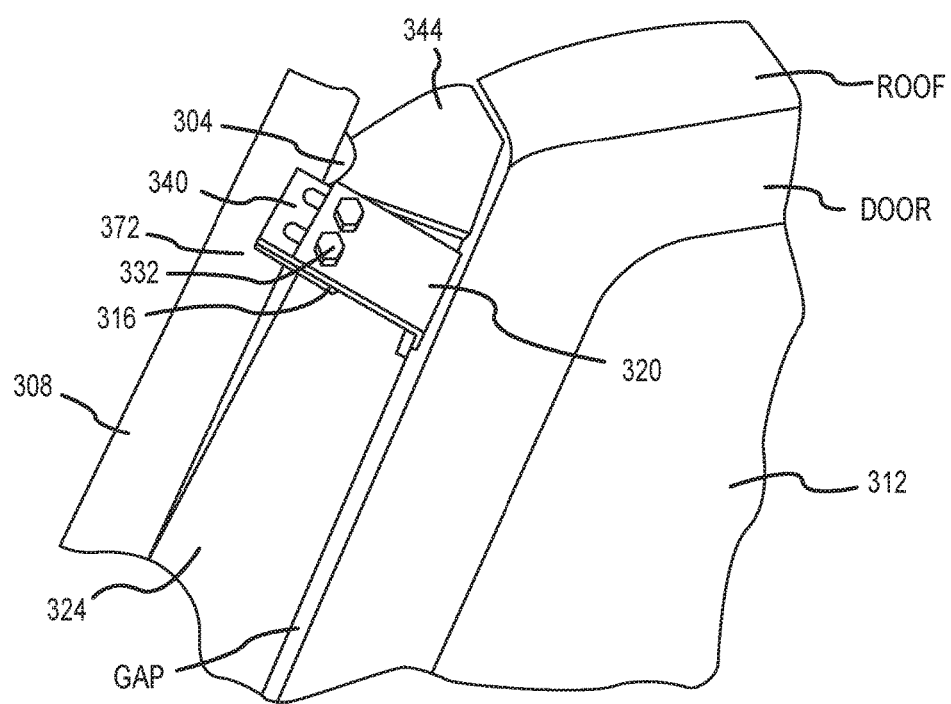
FIG. 34 is a detailed view of FIG. 33.
Figure 37:
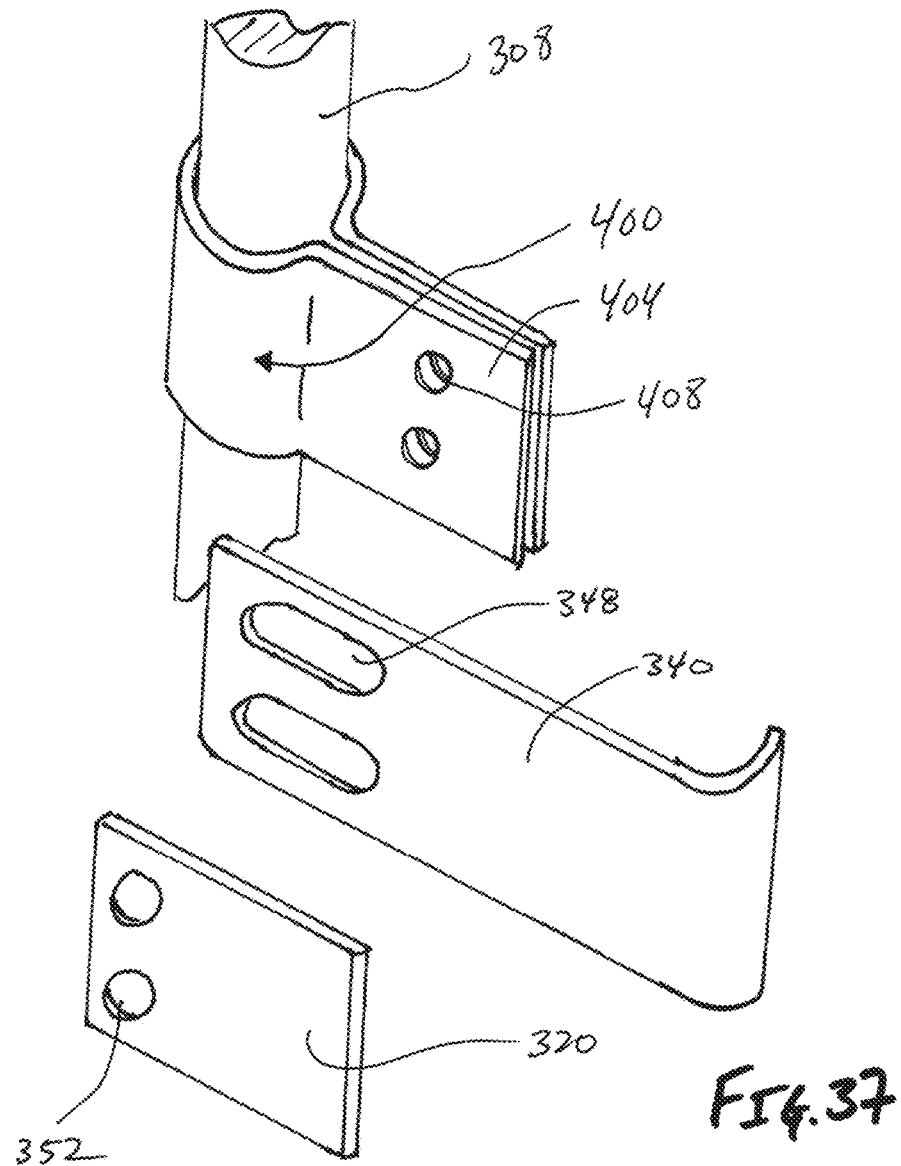
FIG. 37 is a perspective exploded view showing the components of an alternative embodiment of the present invention.

FIG. 37 shows another embodiment of the present invention that decreases vibration and enhances lateral stability of the interconnected vehicle rack. Here, a bracket 400 is positioned about a vertical tube 308 of a front support that was sold without a mounting bracket, similar to that shown in FIG. 2. One of ordinary skill the art will appreciate that the bracket 400 may be interconnected to the tube 308 in various ways, and the version shown in FIG. 37 should not be limiting. Regardless of how the bracket 400 is interconnected to the tube 308, a mounting plate 404 depends therefrom, which employs a plurality of holes 408. The holes 408 receive bolts that interconnect a clamp plate 320 and clamp hook 340 plate as shown in FIGS. 34-36. Because some older versions of the vehicle rack described herein do not include bumpers as shown in FIGS. 34-36, those of ordinary skill in the art will appreciate that a bumper may be retrofitted onto the front support in a similar fashion is that shown in FIG. 37. Otherwise, a rubber block can be positioned between the tube and the frame wherein the lower interconnection system comprising the mounting plate, clamp plate, and clamp hook is interconnected as described above.

Figure 38:
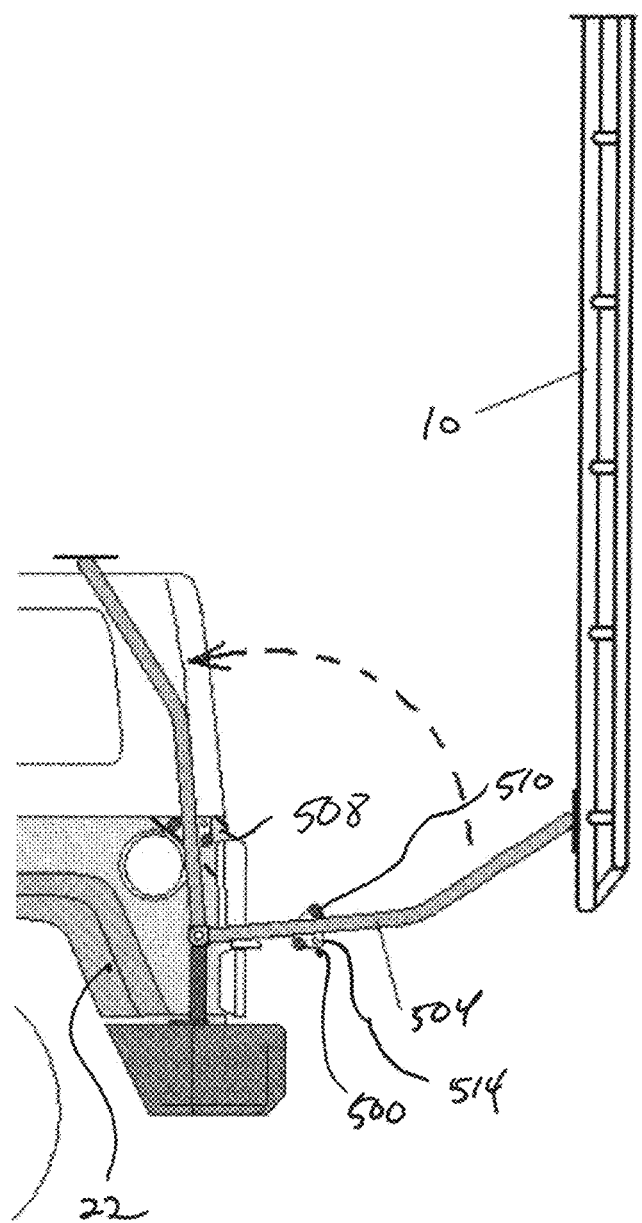
FIG. 38 is a side elevation view showing a rear support of another embodiment of the present invention.

FIGS. 38-40 show an interconnection system for the rear support similar to that shown in FIG. 12. Here, similar to that shown in FIG. 14, a bracket 500 is associated with the rear support 504. In FIG. 14, however, the bracket only includes one bolt that interfaces with a wear pad to help prevent lateral movement of the rack. In this embodiment, a large wear pad 508 is interconnected to a rear portion of the vehicle. In addition, the bracket 500 has been expanded to include a second bolt 510 that includes a pad for compressive contact with the wear pad 508. Thus a two-point load is used to provide more stability between the rear support 504 and the vehicle.

Because it is often desirable to include a ladder, some embodiments the present invention employ a ladder support 600 that is selectively interconnected to the bracket 500 shown in FIG. 38. The bracket 500 includes a hole 514 that receives a bolt associated with the ladder support 600. In this fashion, the ladder support 600 is firmly interconnected to the rear support 504 and able to rotate with the rack 10 as it is moved.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. However, it is to be expressly understood that such modifications and alterations are within the scope and spirit of the present invention, as set forth in the following claims.

What is claimed is:

1. A rack system adapted for selective interconnection to a vehicle, comprising:
    a roof rack adapted to be associated with an upper portion of the vehicle, the roof rack capable of movement from a first position of use adjacent to a roof of the vehicle to a second position of use away from the vehicle roof;
    a front support selectively interconnected to a front portion of the roof rack, the front support adapted to be interconnected to the vehicle near the vehicle's windshield;
    wherein the front support includes at least one contact member configured to engage a frame of the vehicle adjacent to the windshield; and
    a mounting bracket interconnected to the front support, the mounting bracket selectively interconnected to a clamp hook that contacts the vehicle frame adjacent to a door of the vehicle, wherein the at least one contact member is adapted to be compressed against the vehicle frame adjacent to the windshield when the clamp hook is interconnected to the mounting bracket and the vehicle frame.

2. The rack system of claim 1, wherein the at least one contact member is resiliently deflectable.

3. The rack system of claim 1, further comprising:
    a rear support having a first portion interconnected to a rear portion of the roof rack and a second portion operatively associated with the vehicle; and
    a ladder interconnected to an edge of the roof rack, the ladder also being interconnected to the rear support such that the ladder travels with the roof rack as it moves from the first position of use to the second position of use.

4. The rack system of claim 3, wherein the ladder is interconnected to the rear portion of the roof rack.

5. The rack system of claim 3, wherein the rear support is comprised of:
    a first support tower interconnected to a first portion of a body of the vehicle adjacent to a rear vehicle surface and positioned on a left lateral side of the vehicle, the first support tower having an isolator extending laterally therefrom adapted to be associated with the left lateral side of the vehicle, the first support tower interconnected to one end of a first plate, wherein a second end of the first plate includes a clamp portion comprising a pinch plate that is associated with a screw that selectively moves the pinch plate, and a vertical portion, which is interconnected to the first plate, wherein the pinch plate engages the first portion of the body of the vehicle and works in concert with the vertical portion to secure the first support tower to the first portion of the body;
    a second support tower interconnected to a second portion of the body of the vehicle adjacent to a vehicle rear surface and positioned on a right lateral side of the vehicle, the second support tower having an isolator extending laterally therefrom adapted to be associated with the right lateral side of the vehicle, the second support tower interconnected to one end of a second plate, wherein a second end of the second plate includes a clamp portion comprising a pinch plate that is associated with a screw that selectively moves the pinch plate, and a vertical portion, which is interconnected to the second plate, wherein the pinch plate engages the second portion of the body and works in concert with the vertical portion to secure the second support tower to the second portion of the body;
    wherein a first leg of the rear support is positioned on the left lateral surface of the vehicle and operatively interconnected to the first support tower, and a second leg of the rear support is positioned on the right lateral surface of the vehicle and operatively interconnected to the second support tower; and
    wherein the roof rack is interconnected on one end to the rear support between the first leg and the second leg, the roof rack being selectively interconnected on another end to the front support.

6. In combination a convertible roof rack and a vehicle comprising:
    a front support interconnected to the vehicle adjacent to a windshield thereof, the front support having at least one resiliently-deflectable contact member that engages a first portion of a frame of the vehicle adjacent to the windshield, and at least one hook clamp interconnected to the front support and a second portion of the frame adjacent to a door of the vehicle;
    wherein the at least one hook clamp comprises an elongate slot that is operable to receive a fastener and selectively secure a position of the hook clamp relative to the front support;

a first support tower interconnected to the vehicle;

a second support tower interconnected to the vehicle;

a first support having a first end and a second end, the first end rotatably interconnected to the first support tower;

a second support having a first end and a second end, the first end rotatably interconnected to the second support tower;

a roof rack interconnected on one end to the second end of the first support and to the second end of the second support, the roof rack being selectively interconnected on another end to the front support;

wherein the roof rack is capable of movement from a first position of use adjacent to a roof of the vehicle to a second position of use away from the roof while the first and second support towers remain associated with the vehicle; and wherein the front support remains fixed to the vehicle regardless of the position of the roof rack.

7. The combination of claim 6, wherein the at least one resiliently-deflectable contact member comprises a rubber member that is biased towards the first portion of the frame by the at least one hook clamp.

8. The combination of claim 6, further comprising a ladder interconnected to the roof rack, wherein the ladder travels with the roof rack as it moves from the first position of use to the second position of use.

9. The combination of claim 6, wherein:

the first support tower is interconnected to a first end of a first plate, wherein a second end of the first plate includes a clamp portion comprising a pinch plate associated with a member that selectively moves the pinch plate, and a vertical portion, wherein the pinch plate engages a first portion of a body of the vehicle and works in concert with the vertical portion to secure the first support tower to the first portion of the body; and the second support tower is interconnected to a first end of a second plate, wherein a second end of the second plate includes a clamp portion comprising a pinch plate associated with a member that selectively moves the pinch plate, and a vertical portion, wherein the pinch plate engages a second portion of the body of the vehicle and works in concert with the vertical portion to secure the second support tower to the second portion of the body.

10. A roof rack adapted for use with a vehicle, comprising:

a roof rack adapted to be associated with the vehicle and positioned adjacent to a roof of the vehicle, the roof rack capable of movement from a first position of use adjacent to the roof to a second position of use away from the roof;

a sunroof insert selectively interconnected to the roof rack, wherein the sunroof insert comprises a plurality of ears that are operable to engage the roof rack;

a front support interconnected to the roof rack and adapted to be interconnected to the vehicle near a windshield of the vehicle, wherein the front support includes at least one contact member that engages a frame of the vehicle;

a hook clamp having a first end operable to contact the vehicle and a second end comprising at least one slot for receiving a fastener, wherein the at least one contact member is adapted to be compressed against the vehicle when the hook clamp is interconnected to the front support;

a rear support structure interconnected to the roof rack and adapted to be interconnected to the vehicle; and a ladder interconnected to the roof rack, the ladder also being interconnected to the rear support structure such that the ladder travels with the roof rack as it moves from the first position of use to the second position of use.

11. The roof rack of claim 10, further comprising an isolator associated with the rear support structure that is adapted to engage a portion of the vehicle.

12. The roof rack of claim 10, wherein the rear support structure comprises:

a first support tower adapted for interconnection to a first portion of a body of the vehicle, the first support tower interconnected to a first end of a first plate, wherein a second end of the first plate comprises a first clamp adapted for interconnection with the first portion of the body;

a second support tower adapted for interconnection to a second portion of the body of the vehicle, the second support tower interconnected to a first end of a second plate, wherein a second end of the second plate comprises a second clamp adapted for interconnection with the second portion of the body;

a support bar having a first leg operatively interconnected to the first support tower, and a second leg operatively interconnected to the second support tower; and wherein the roof rack is interconnected on one end to the support bar between the first leg and the second leg, the roof rack being selectively interconnected on another end to the front support.

13. The roof rack of claim 10, wherein the at least one contact member is resiliently-deflectable.

* * * * *